United States Patent
Sommer et al.

(10) Patent No.: US 12,312,472 B2
(45) Date of Patent: May 27, 2025

(54) BINDER COMPOSITION COMPRISING POLYAMINE(S) AS WELL AS 1,3-DIHYDROXYACETONE, GLYCOLALDEHYDE AND/OR GLYCERALDEHYDE FOR COMPOSITE ARTICLES

(71) Applicant: BASF SE, Ludwigshafen am Rhein (DE)

(72) Inventors: Gereon Antonius Sommer, Ludwigshafen am Rhein (DE); Guenter Scherr, Ludwigshafen am Rhein (DE); Stephan Weinkoetz, Ludwigshafen am Rhein (DE); Thomas Servay, Ludwigshafen am Rhein (DE); Jessica Nadine Hamann, Ludwigshafen am Rhein (DE); Joaquim Henrique Teles, Ludwigshafen am Rhein (DE); Ralph Lunkwitz, Ludwigshafen am Rhein (DE); David Tuerp, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/268,989

(22) PCT Filed: Dec. 22, 2021

(86) PCT No.: PCT/EP2021/087428
§ 371 (c)(1),
(2) Date: Jun. 22, 2023

(87) PCT Pub. No.: WO2022/136613
PCT Pub. Date: Jun. 30, 2022

(65) Prior Publication Data
US 2024/0052168 A1    Feb. 15, 2024

(30) Foreign Application Priority Data
Dec. 23, 2020   (EP) .................................. 20216812

(51) Int. Cl.
| C08L 97/02 | (2006.01) |
| B27N 3/00 | (2006.01) |
| B27N 3/02 | (2006.01) |
| C08G 69/10 | (2006.01) |
| C08G 69/26 | (2006.01) |

(52) U.S. Cl.
CPC .............. C08L 97/02 (2013.01); B27N 3/002 (2013.01); B27N 3/02 (2013.01); C08G 69/10 (2013.01); C08G 69/265 (2013.01)

(58) Field of Classification Search
CPC ...... C08G 69/10; C08G 69/26; C08G 69/265; C08G 69/48; C08G 12/46; C08K 5/07; C08L 97/02; C08L 61/06; C08L 61/24; C08L 61/28; C08L 77/04; C08L 79/02; C08L 91/08; B27N 3/002; B27N 3/02; B27N 3/12; B32B 21/02; B32B 21/042; B32B 21/14; C09J 161/20; C09J 161/22; C09J 177/02; C09J 177/06; C09J 179/02
See application file for complete search history.

(56) References Cited

U.S. PATENT DOCUMENTS

| 4,507,172 | A | 3/1985 | Steltenkamp |
| 5,410,089 | A | 4/1995 | Gehrer et al. |
| 5,508,422 | A | 4/1996 | Teles et al. |
| 2011/0262648 | A1 | 10/2011 | Lee et al. |
| 2011/0263757 | A1 | 10/2011 | Rand et al. |
| 2013/0323492 | A1 | 12/2013 | Finch et al. |
| 2015/0315339 | A1* | 11/2015 | Pacorel ............. C08G 73/0206 536/55 |
| 2017/0101430 | A1 | 4/2017 | Enqvist et al. |
| 2017/0355723 | A1 | 12/2017 | Tikka |

FOREIGN PATENT DOCUMENTS

| CA | 2256923 | A1 | 6/2000 |
| DE | 3901662 | A1 | 7/1989 |
| DE | 4124948 | A1 | 1/1993 |
| EP | 0568872 | A1 | 11/1993 |
| EP | 0786456 | A2 | 7/1997 |
| EP | 2386394 | A1 | 11/2011 |
| EP | 2386605 | A1 | 11/2011 |

(Continued)

OTHER PUBLICATIONS

International Preliminary Report on Patentability received for PCT Patent Application No. PCT/EP2021/087428, mailed on Nov. 14, 2022, 6 pages.
International Search Report and Written Opinion received for PCT Patent Application No. PCT/EP2021/087428, mailed on Apr. 26, 2022, 11 pages.
Bajpai, P., "Pulp and handsheets of overthick (left) chips, accept chips (center), and fine chips (right) after kraft pulping," Biermann's Handbook of Pulp and Paper (Third Edition), vol. 1—Raw Material and Pulp Making, Chapter 12—Pulping Fundamentals, Sep. 21, 2018, pp. 295.
Brunnmuller, F., "Aminoplaste," Verlag Chemie, Ullmanns Encyklopadie der technischen Chemie, Band 7, 4th edition, 1973, pp. 403-424.

(Continued)

Primary Examiner — Camie S Thompson
(74) Attorney, Agent, or Firm — Faegre Drinker Biddle & Reath LLP

(57) ABSTRACT

The present invention relates to a binder composition comprising a) component A comprising polymer(s) A1 having primary and/or secondary amino groups, wherein polymer(s) A1 has(have) a primary and secondary amine group nitrogen content of at least 1 wt.-% and b) component B comprising component B1 which is 1,3-dihydroxyacetone, glycolaldehyde, glyceraldehyde or any mixture thereof, wherein the polymer(s) A1 has(have) a total weight average molecular weight $M_{w,total}$ of at least 800 g/mol.

30 Claims, No Drawings

(56) References Cited

FOREIGN PATENT DOCUMENTS

| EP | 2669349 | A1 | 12/2013 |
|---|---|---|---|
| EP | 3080178 | A1 | 10/2016 |
| EP | 3156409 | A1 | 4/2017 |
| WO | 2006/038863 | A1 | 4/2006 |
| WO | 2007/060119 | A1 | 5/2007 |
| WO | 2011/138458 | A1 | 11/2011 |
| WO | 2012/027767 | A1 | 3/2012 |
| WO | 2013/070130 | A1 | 5/2013 |
| WO | 2015/022186 | A1 | 2/2015 |
| WO | 2015/086074 | A1 | 6/2015 |
| WO | 2015/177114 | A1 | 11/2015 |
| WO | 2016/009062 | A1 | 1/2016 |
| WO | 2016/062578 | A1 | 4/2016 |
| WO | 2018/197222 | A1 | 11/2018 |

OTHER PUBLICATIONS

Deppe et al., "MDF-Mitteldichte Faserplatten, Chapter 4—Fertigungstechmologie," DRV-Verlag, 1996, pp. 43-46.
Deppe et al., "MDF-Mitteldichte Faserplatten, Chapter 4.5—Pressen," DRV-Verlag, 1996, pp. 93-104.
Deppe et al., "Taschenbuch der Spanplattentechnik, Chapter 3.5—Verpressung," DRV-Verlag, 1977, pp. 232-254.
Diem et al., "Amino Resins," Ullmanns Encyklopadie der technischen Chemie, vol. A2, 1985, pp. 115-141.
Dunky et al., "Einfluß der SpangroBenverteilung auf den Beleimungsgrad der Spane," Holzforschung und Holzverwertung, vol. 40, Dec. 1988, pp. 126-133.
Dunky et al., "Holzwerkstoffe und Leime Technologie und Einflussfaktoren," 2002, pp. 965.
Franke et al., "Polyurethane—Kunststoff Handbuch 7, Chapter 12—Polyurethansysteme und Polyisocyanate als Ausgangsstoffe für Bindemittel," Hanser, Carl, 3rd Edition, vol. 7, 1993, pp. 665-671.
Frey et al., "Delignified and Densified Cellulose Bulk Materials with Excellent Tensile Properties for Sustainable Engineering," ACS Applied Materials & Interfaces, vol. 10, No. 5, Jan. 26, 2018, 5030-5037.
Gardziella et al., "Duroplaste—Kunststoff Handbuch 10, Chapter 1.2.2—Phenolharze (PF)," Hanser, Carl, 2nd Edition, vol. 10, 1988, pp. 12-40.
Hahn, W., "Polyurethane—Kunststoff Handbuch 7, Chapter 2.2—Wichtige Aufbaukomponenten für Polyurethane," Hanser, Carl, 3rd Edition, vol. 7, 1993, pp. 17-21.
Meyer et al., "Gas pressure measurements during continuous hot pressing of particleboard," Holz als Roh-und Werkstoff volume, vol. 65, Aug. 26, 2006, pp. 49-55.
Niemz et al., "2.4.4 Werkstoffe auf Spanbasis,"Chapter 2: Werkstoffe aus Holz, Taschenbuch der Holztechnik, Jun. 2012, pp. 206-230.
Niemz et al., "Chapter 2—Werkstoffe aus Holz," Taschenbuch der Holztechnik, Jun. 2012, pp. 127-259.
Preussmann et al. "Untersuchungen zum Nachweis alkylierender Agentien, I Spektrophotometrische Bestimmung von Diazoalkanen mit 4-[4-Nitro-benzyl]-pyridinium-perchlorat," Justus Liebigs Annalen der Chemie, vol. 684, Issue 1, May 1, 1965, pp. 57-61.
Schauerte et al., "Polyurethane—Kunststoff Handbuch 7, Chapter 3.2—Isocyanate," Hanser, Carl, 3rd Edition, vol. 7, 1993, pp. 76-88.
Schömer et al., "Hyperbranched aliphatic polyether polyols," Journal of Polymer Science, Part A: Polymer Chemistry, vol. 51, Issue 5, Mar. 1, 2013, pp. 995-1019.
Steuerle et al., "Aziridines," Ullmann's Encyclopedia of Industrial Chemistry, vol. 4, 2012, pp. 515-521.
Thoemen et al., "Wood-Based Panels, An Introduction for Specialists," Brunel University Press, 2010, pp. 152.
Thoemen, H., "Vom Holz zum Werkstoff—Grundlegende Untersuchungen zur Herstellung und Struktur von Holzwerkstoffen," Berner Fachhochschule Architektur, Holz und Bau, 2010, pp. 76.
Zhu et al., "Highly Anisotropic, Highly Transparent Wood Composites," Advanced Materials, vol. 28, Issue 26, Jul. 13, 2016, pp. 5181-5187.

* cited by examiner

BINDER COMPOSITION COMPRISING POLYAMINE(S) AS WELL AS 1,3-DIHYDROXYACETONE, GLYCOLALDEHYDE AND/OR GLYCERALDEHYDE FOR COMPOSITE ARTICLES

CROSS-REFERENCE TO RELATED APPLICATIONS

This application is a National stage application (under 35 U.S.C. § 371) of PCT/EP2021/087428, filed Dec. 22, 2021, which claims benefit of European Application No. 20216812.6, filed Dec. 23, 2020, both of which are incorporated herein by reference in their entirety.

The present invention relates to a binder composition comprising
- a) component A comprising polymer(s) A1 having primary and/or secondary amino groups wherein polymer(s) A1 has(have) a primary and secondary amine group nitrogen content of at least 1 wt.-% and
- b) component B comprising component B1 which is 1,3-dihydroxyacetone, glycolaldehyde, glyceraldehyde or any mixture thereof,
wherein polymer(s) A1 has(have) a total weight average molecular weight $M_{w,total}$ of at least 800 g/mol.

Further, the present invention relates to a composition kit for the preparation of lignocellulose-based composite articles comprising the binder composition, wherein component A and component B are stored separately, and to lignocellulose-based composite articles comprising a plurality of lignocellulosic pieces and the reacted binder composition. Moreover, the present invention relates to processes of forming lignocellulose-based composite articles comprising the reacted binder composition as well as to a plastic material comprising reacted components A and B, in particular the reacted binder composition.

Lignocellulose-based composite articles, such as oriented strand board (OSB), oriented strand lumber, chipboard, also called particleboard, scrimber, agrifiber board, flakeboard, and fiberboard, e.g. medium density fiberboard (MDF), are generally produced by blending or spraying lignocellulosic pieces with a binder composition, e.g. a resin, while the lignocellulosic pieces are tumbled or agitated in a blender or similar apparatus. After blending sufficiently to form a binder composition-lignocellulose mixture, the lignocellulosic pieces, which are now coated with the binder composition, are formed into a product, in particular a loose mat, which is subsequently compressed between heated platens or plates to set the binder composition and to bond these lignocellulosic pieces together in densified form, such as in a board, panel, or other shape. Conventional processes for compressing the loose mat are generally carried out by hot pressing along with heat transfer from hot surfaces (usually between 180° C. and 240° C.) to the mat, in the presence of varying amounts of steam, either purposefully injected into the loose mat or generated by liberation of entrained moisture from the lignocellulosic pieces or the binder composition in the loose mat.

Binder compositions that have been used for making such lignocellulose-based composite articles include phenol formaldehyde (PF) resins, urea formaldehyde (UF) resins, melamine urea formaldehyde (MUF) resins and isocyanates (M. Dunky, P. Niemz, Holzwerkstoffe and Leime, Springer Verlag Heidelberg, 2002, pages 249 to 367). From an environmental perspective there is the need to provide binder compositions which are formaldehyde-free and isocyanate-free and still have excellent properties.

Carbohydrate-based binder compositions are mainly derived from renewable resources. They require press conditions which are quite different from the traditional phenol-formaldehyde binder composition, urea formaldehyde or isocyanate resins. Carbohydrate polyamine binder compositions can substitute said traditional binder compositions. However, carbohydrate polyamine binder composition solutions are associated with a variety of disadvantages such as large binder composition amounts, long press times and poor structural properties of the resulting boards. WO2015177114 describes a binder composition for wood boards comprising a reaction product of lysine and a carbohydrate component, but the obtained wood boards have low internal bond strengths even at long press times. WO2016009062 describes a binder composition comprising a carbohydrate and a polyamine and a matrix polymer. However, such binder compositions for chipboards require long press times and result in chipboards with a low internal bond strength and an insufficient swelling value in water.

It is an object of the invention to provide a binder composition, in particular for lignocellulose-based composite articles, which comprises reduced amounts of formaldehyde and/or isocyanate or is formaldehyde-free and/or isocyanate-free, and which provides good mechanical properties to the composite articles. In particular, it is an object of the invention to provide binder compositions, which may be stored and transported easily, and which require low binder composition amounts and/or short press times to achieve lignocellulose-based composite article with good mechanical properties and swelling values.

This object is achieved by a binder composition, preferably a wood binder composition, comprising
- a) component A comprising polymer(s) A1 having primary and/or secondary amino groups wherein polymer(s) A1 has(have) a primary and secondary amine group nitrogen content of at least 1 wt.-% and
- b) component B comprising component B1, which is 1,3-dihydroxyacetone, glycolaldehyde, glyceraldehyde or any mixture thereof, wherein the polymer(s) A1 has(have) a total weight average molecular weight $M_{w,total}$ of at least 800 g/mol.

Binder composition means component A and component B and optionally any further component prior to reacting. The binder composition may be cured by applying temperature and/or pressure at the same time or subsequently to obtain the reacted binder composition. The reacted binder composition means the cured binder composition. The reacted binder composition is obtainable or may be obtained by reacting the binder components A and B.

The term primary and/or secondary amino groups as used according to the present invention does not include amide-groups such as e.g. R—CO—NH$_2$ and/or R—CO—NH—R.

Preferably, component B1 comprises 1,3-dihydroxyacetone, more preferably component B1 comprises or consists of a mixture of 1,3-dihydroxyacetone, glycolaldehyde and glyceraldehyde. Component B of the binder composition may be a mixture obtained by a formose reaction from formaldehyde.

Preferably, component B1 is a mixture consisting of
  1 to 30 wt.-% 1,3-dihydroxyacetone,
  10 to 50 wt.-% glycolaldehyde and
  20 to 80 wt.-% glyceraldehyde
  based on the total weight of component B1, wherein the weight amounts of 1,3-dihydroxyacetone, glycolaldehyde and glyceraldehyde are selected such that the total weight of the sum of 1,3-dihydroxyacetone, glycolaldehyde, and glyceraldehyde is 100 wt.-%.

Reacting or reacted means that polymer(s) A1 react(s) with 1,3-dihydroxyacetone, glycolaldehyde and/or glyceraldehyde. Besides, further components may also react with polymer(s) A1 and/or 1,3-dihydroxyacetone and/or glycolaldehyde and/or glyceraldehyde. The reaction may lead to crosslinked polymers.

Optionally reacting or reacted means that polymer(s) A1 react(s) with 1,3-dihydroxyacetone and/or glycolaldehyde and/or glyceraldehyde and
- optionally polymer(s) A1 react(s) with component B2 and
- optionally polymer(s) A1 react(s) with themselves (itself) and
- optionally 1,3-dihydroxyacetone and/or glycolaldehyde and/or glyceraldehyde react(s) with each component itself and/or with each other and
- optionally 1,3-dihydroxyacetone and/or glycolaldehyde and/or glyceraldehyde reacts with component B2. Component B2 is further explained below.

Component A may comprise 20 to 80 wt.-%, preferably 30 to 70 wt.-%, preferably 40 to 65 wt.-% of the polymer(s) A1 based on the total weight of component A.

Optionally the binder composition according to the present invention comprises at least 10 wt.-%, preferably at least 20 wt.-%, preferably at least 30 wt.-%, preferably at least 40 wt.-%, preferably at least 50 wt. %, preferably at least 60 wt.-%, preferably at least 70 wt.-% polymer(s) A1 based on the total weight of the sum of polymer(s) A1 and component B1.

The binder composition according to the present invention may comprise
- 10 to 95 wt.-%, preferably 20 to 95 wt.-%, preferably 30 to 95 wt.-%, preferably 40 to 90 wt.-%, preferably 50 to 90 wt.-%, preferably 60 to 85 wt.-% preferably 70 to 85 wt.-% polymer(s) A1, based on the total weight of the sum of polymer(s) A1 and component B1.

Advantageously, the components A and B are not provided as a mixture, and this allows easy transportation and long storage for several months. Therefore, according to one aspect of the present invention, the binder composition is provided as a kit, wherein Component A and Component B are stored separately.

Components A and B may be brought into contact either directly on the lignocellulosic pieces, preferably made from wood, or by mixing them before the application to the lignocellulosic pieces, preferably made from wood.

Component A and/or B may be provided in the form of an aqueous solution or dispersion. wt.-% means weight-%.
Component A:
Polymer(s) A1:

Component A comprise one polymer A1 having primary and/or secondary amino groups or different polymers A1 having primary and/or secondary amino groups, wherein polymer(s) A1 has(have) a primary and secondary amine nitrogen content ($NC_{ps}$) of at least 1 wt.-%.

Polymer A1 is a polymerization product of one or of several monomers. The term "polymer" is used for such polymerization product, even if the polymerization reaction is not run to completion. Polymer A1 may consist of dimers (n=2), trimers (n=3), oligomers (n=4-10) and macromolecules (n>10)—wherein n is the number of monomers which have been reacted to form the dimers, trimers, oligomers and macromolecules—and may also include monomers. These monomers may be present due to incomplete conversion of the monomers during the polymerization reaction and/or due to an addition of additional monomers after finishing the polymerization reaction, wherein the additional monomers are selected from the group of the monomers, which have been used for the polymerization reaction. Preferably, no monomers are added after finishing the polymerization reaction.

The primary amine nitrogen content ($NC_p$) is the content of nitrogen in wt.-% nitrogen which corresponds to the primary amine groups in polymer(s) A1. The secondary amine nitrogen content ($NC_s$) is the content of nitrogen in wt.-% nitrogen which corresponds to the secondary amine groups in polymer(s) A1. The primary and secondary amine group nitrogen content of the polymer(s) A1 ($NC_{ps}$) is calculated using the following equation:

$$NC_{ps}=NC_p+NC_s$$

The primary amino group nitrogen content ($NC_p$) and the secondary amino group nitrogen content ($NC_s$) can be measured based on EN ISO 9702:1998 (determination of primary, secondary and tertiary amino group nitrogen content).

The wording "polymer(s) A1 has(have) a primary and secondary amine group nitrogen content ($NC_{ps}$) of at least 1 wt.-%" means the following:

If polymer(s) A1 consist(s) of one polymer having primary and/or secondary amino groups, the polymer A1 has a $NC_{ps}$ of at least 1 wt.-%, or if polymer(s) A1 consist of different polymers having primary and/or secondary amino groups, these polymers A1 in total have a $NC_{ps}$ of at least 1 wt.-%.

Optionally polymer(s) A1 has(have) a $NC_{ps}$ of at least 1 wt.-%, preferably at least 3 wt.-%, preferably at least 5 wt.-%, more preferably at least 7 wt.-% and optionally at least one polymer of polymers A1, preferably each polymer A1, has a $NC_{ps}$ of at least 1 wt.-%, preferably at least 3 wt.-%, preferably at least 5 wt. %, more preferably at least 7 wt.-%.

Optionally polymer(s) A1 has(have) a $NC_{ps}$ from 1 to 33 wt.-%, preferably from 3 to 30 wt.-%, preferably from 5 to 25 wt.-%, preferably from 7 to 20 wt.-% and
- optionally at least one polymer of polymer(s) A1, preferably each polymer A1, has a $NC_{ps}$ from 1 to 33 wt.-%, preferably from 3 to 30 wt.-%, preferably from 5 to 25 wt.-%, preferably from 7 to 20 wt.-%.

In case component A comprises one polymer A1, this polymer A1 has a weight-average molecular weight $M_w$ of at least 800 g/mol, preferably at least 1,000 g/mol, more preferably at least 1,400 g/mol, more preferably at least 1,500 g/mol and optionally has a weight average molecular weight $M_w$ of at most 100,000 g/mol, preferably at most 70,000 g/mol, preferably at most 50,000 g/mol, preferably at most 20,000 g/mol and more preferably at most 10,000 g/mol and most preferably at most 5,000 g/mol.

In case component A comprises different polymers A1, these polymers A1 have a total weight-average molecular weight $M_{w,total}$ of at least 800 g/mol, preferably at least 1,000 g/mol, more preferably at least 1,400 g/mol, most preferably at least 1,500 g/mol and optionally polymers A1 have a total weight average molecular weight $M_{w,total}$ of at most 100,000 g/mol, preferably at most 70,000 g/mol, preferably at most 50,000 g/mol, preferably at most 20,000 g/mol, preferably at most 10,000 g/mol and most preferably at most 5,000 g/mol.

Weight-average molecular weights are determined by size exclusion chromatography (SEC) as described in the example section ("Measured values and measuring methods"). The weight-average molecular weight $M_w$ refers to the weight-average molecular weight of one single polymer A1 and is determined by size exclusion chromatography (SEC) for each polymer A1 separately.

The total weight-average molecular weight $M_{w,total}$ of the polymers A1 in total may be calculated via equation (1) from the individual weight-average molecular weights $M_{w,j}$ of each polymer $A1_j$ (j=1 to k with k being the number of individual polymers A1 in the totality of polymers A1).

$$M_{w,total} = \frac{\sum_j p_j M_{w,j}^2}{\sum_j p_j M_{w,j}} \quad (1)$$

The number portion $p_j$ is calculated from the mass portion $m_j$ and the weight-average molecular weight $M_{w,j}$ of each single polymer via equations (2) and (3).

$$p_j = \frac{n_j}{\sum_j n_j} \quad (2)$$

$$n_j = \frac{m_j}{M_{w,j}} \quad (3)$$

If for example polymers A1 consist of 20 wt.-% polymer A1i ($M_{w,1}$=500 g/mol), 30 wt.-% polymer $A1_2$ ($M_{w,2}$=2000 g/mol) and 50 wt.-% polymer A1a ($M_{w,3}$=5000 g/mol), the total weight-average molecular weight $M_{w,total}$ is 3200 g/mol. If polymer A1 consists of one single polymer A1, e.g. polymer $A1_2$ ($M_{w,2}$=2000 g/mol), then $M_{w,total}$ is identical to the $M_w$ of this single polymer A1.

Polymer(s) A1 may contain less than 15 wt.-% monomers, more preferably less than 10 wt.-% monomers, more preferably less than 8 wt.-% monomers based on the total weight of polymer(s) A1 including its monomers.

Each polymer A1 may contain less than 15 wt.-% monomers, more preferably less than 10 wt.-% monomers, more preferably less than 8 wt.-% monomers based on the weight of said polymer A1 including its monomers.

Optionally polymer(s) A1 have a total weight-average molecular weight $M_{w,total}$ of at least 800 g/mol, preferably at least 1,000 g/mol, more preferably at least 1,400 g/mol, most preferably at least 1,500 g/mol and optionally polymers A1 have a total weight average molecular weight $M_{w,total}$ of at most 100,000 g/mol, preferably at most 70,000 g/mol, preferably at most 50,000 g/mol, preferably at most 20,000 g/mol, preferably of at most 10,000 g/mol and preferably at most 5,000 g/mol and optionally at least one polymer A1, preferably each polymer A1, has a weight-average molecular weight $M_w$ of at least 800 g/mol, preferably at least 1,000 g/mol, more preferably at least 1,400 g/mol, most preferably at least 1,500 g/mol and optionally at least one polymer A1, preferably each polymer A1, has a weight average molecular weight $M_w$ of at most 100,000 g/mol, preferably at most 70,000 g/mol, preferably at most 50,000 g/mol, preferably at most 20,000 g/mol, preferably at most 10,000 g/mol and preferably at most 5,000 g/mol.

Polymer(s) A1 may comprise or consist of branched polymer(s).

In case component A comprises one polymer A1, this polymer A1 is preferably a branched polymer. In case component A comprises different polymers A1, preferably at least one of the polymers A1, more preferably each polymer A1, is a branched polymer. Optionally at least one polymer A1, more preferably each polymer A1, has a degree of branching (DB) of at least 0.05, preferably from 0.05 to 0.99, preferably from 0.07 to 0.9, and more preferably from 0.1 to 0.5.

The DB is determined by $^1$H-NMR-spectroscopy. The DB is obtained by comparison of the intensity of the signals. The degree of branching is calculated according to the following equation: DB=(D+T)/(D+L+T), wherein D, T and L are the fractions of dendritic, terminal or linearly incorporated monomers in the resulting branched polymers obtained from integration of the respective signals in NMR-spectra. For further information reference is further made to H. Frey et al., Acta Polym. 2013, 51, 995-1019.

Optionally polymer(s) A1 has (have) a total weight-average molecular weight $M_{w,total}$ of at least 800 g/mol, preferably at least 1,000 g/mol, more preferably at least 1,400 g/mol, more preferably at least 1,500 g/mol and optionally polymer(s) A1 has (have) a total weight-average molecular weight $M_{w,total}$ of at most 100,000 g/mol, preferably at most 70,000 g/mol, preferably at most 50,000 g/mol, preferably at most 20,000 g/mol, more preferably at most 10,000 g/mol, and more preferably at most 5,000 g/mol and optionally at least one polymer A1, preferably each polymer A1, has a weight-average molecular weight $M_w$ of at least 800 g/mol, preferably at least 1,000 g/mol, more preferably at least 1,400 g/mol, more preferably at least 1,500 g/mol and optionally at least one polymer, preferably each polymer A1, has a weight average molecular weight $M_w$ of at most 100,000 g/mol, preferably at most 70,000 g/mol, preferably at most 50,000 g/mol, preferably at most 20,000 g/mol and more preferably at most 10,000 g/mol and more preferably at most 5,000 g/mol and optionally polymer(s) A1 has(have) a $NC_{ps}$ from 1 to 33 wt.-%, preferably from 3 to 30 wt.-%, preferably from 5 to 25 wt.-%, preferably from 7 to 20 wt.-% and optionally at least one polymer of polymer(s) A1, preferably each polymer A1, has a $NC_{ps}$ from 1 to 33 wt.-%, preferably from 3 to 30 wt.-%, preferably from 5 to 25 wt.-%, preferably from 7 to 20 wt.-% and optionally at least one polymer of polymer(s) A1, preferably each polymer) A1 has a degree of branching of at least 0.05, preferably from 0.05 to 0.99, preferably from 0.07 to 0.9, more preferably from 0.1 to 0.5.

Polymer(s) A1 preferably comprise(s), and more preferably consist(s) of at least one linear or preferably branched polymer selected from the group consisting of (i) polyalkyleneimines,
(ii) polyamides,
(iii) block copolymers comprising polyalkyleneimine segments and polyamide segments
(iv) graft copolymers comprising polyalkyleneimine segments and polyamide segments and
(v) mixtures of at least two of the polymers (i), (ii), (iii) and/or (iv).

Block copolymers comprise subunits of different polymer types (segments), e.g. one or more segments of polyamide and one or more segments of polyalkyleneimine. Block copolymers containing polyalkyleneimine segments and polyamide segments may be prepared by stepwise synthesis. For example, a polyalkyleneimine and a polyamide with terminal carboxylic groups can be synthesized separately and are combined in an additional condensation step to form a block copolymer.

Graft copolymers containing polyalkyleneimine segments and polyamide segments may contain a polyamide segment as main chain (backbone) and polyalkyleneimine segments as side chains or a polyalkyleneimine segment as main chain (backbone) and polyamide segments as side chains, preferably a polyamide segment as main chain (backbone) and polyalkyleneimine segments as side chains. Such graft copolymers can be prepared by reacting separately synthesized polyamides with primary and/or secondary amine groups with ethyleneimine. Preferably, polymer(s) A1 comprises at least one or consists of a graft polymerization product consisting of a backbone segment of polymerized diethylenetriamine and adipic acid grafted with segments of polyethyleneimine. Further details are given in DE4124948 A1.

The binder composition, in particular binder component A, more particularly polymer(s) A1 may comprise one or more polymers P each having a weight-average molecular weight $M_w$ in the range of 1,000 to 500,000 g/mol, preferably 1,000 to 100,000 g/mol, which may be obtained by reaction of at least one polymer with primary and/or secondary amine groups, which can be selected from the group consisting of
  (i) polyalkyleneimines,
  (ii) (ii) polyamides,
  (iii) (iii) block copolymers comprising polyalkyleneimine segments and polyamide segments,
  (iv) (iv) graft copolymers comprising polyalkyleneimine segments and polyamide segments, and
  (v) mixtures of at least two of (i), (ii), (iii) and/or (iv)
with alpha-hydroxy carbonyl compounds, like 1,3-dihydroxyacetone, glycolaldehyde and/or glyceraldehyde and/or carbohydrates as e.g. defined below, preferably with 1,3-dihydroxyacetone, glycolaldehyde and/or glyceraldehyde.

Optionally the binder composition, in particular binder component A, more particularly polymer(s) A1, comprise(s) one or more polymers P in an amount of less than 2 wt.-%, preferably less than 1 wt.-%, more preferably less than 0.5 wt.-%, more preferably less than 0.1 wt.-% based on the total weight of the binder composition. Most preferably, the binder composition, in particular binder component A, more particularly polymer(s) A1, do(es) not comprise any polymer P. For the sake of clarity this definition refers to the unreacted binder composition.

Optionally the binder composition, in particular binder component A, more particular polymer(s) A1, comprise(s) one or more polymers P in an amount of less than 2 wt.-%, preferably less than 1 wt.-%, more preferably less than 0.5 wt.-%, more preferably less than 0.1 wt.-% based on the total weight of the sum of polymer(s) A1 and component B1 and component B2. Most preferably, the binder composition, in particular binder component A, more particularly polymer(s) A1, do(es) not comprise any polymer P. For the sake of clarity this definition refers to the unreacted binder composition.

Preferably, polymer(s) A1 is (are) selected from the group consisting of
  (i) polyalkyleneimines,
  (ii) polyamides,
  (iii) block copolymers comprising polyalkyleneimine segments and polyamide segments,
  (iv) graft copolymers comprising polyalkyleneimine segments and polyamide segments and
  (v) mixtures of at least two of (i), (ii), (iii) and/or (iv), and
optionally polymer(s) A1 has (have) a total weight-average molecular weight $M_{w,total}$ in the range from 800 g/mol to 50,000 g/mol, preferably 800 g/mol to 20,000 g/mol, preferably 800 g/mol to 10,000 g/mol, preferably 1,500 g/mol to 5,000 g/mol, preferably 1000 g/mol to 7,500 g/mol, preferably 1150 g/mol to 5,000 g/mol, more preferably 1,300 g/mol to 3,000 g/mol.

Optionally polymer(s) A1 has (have) a total weight-average molecular weight $M_{w,total}$ in the range from 800 g/mol to 50,000 g/mol, preferably 800 g/mol to 20,000 g/mol, preferably 800 g/mol to 10,000 g/mol, preferably 1,500 g/mol to 10,000 g/mol, preferably 1,500 g/mol to 5,000 g/mol, preferably 1,000 g/mol to 7,500 g/mol, preferably 1,150 g/mol to 5,000 g/mol, more preferably 1,300 g/mol to 3,000 g/mol and optionally at least one polymer A1, preferably each polymer A1, has a weight-average molecular weight in the range from 800 g/mol to 50,000 g/mol, preferably 800 g/mol to 20,000 g/mol, preferably 800 g/mol to 10,000 g/mol, preferably 1,500 g/mol to 10,000 g/mol, preferably 1,500 g/mol to 5,000 g/mol, preferably 1,000 g/mol to 7,500 g/mol, preferably 1,150 g/mol to 5,000 g/mol, more preferably 1,300 g/mol to 3,000 g/mol
and optionally polymer(s) A1 has(have) a $NC_{ps}$ from 1 to 33 wt.-%, preferably from 3 to 30 wt.-%, preferably from 5 to 25 wt.-%, preferably from 7 to 20 wt.-%, preferably from 8 to 15 wt.-% and optionally at least one polymer of polymer(s) A1, preferably each polymer A1, has (have) a $NC_{ps}$ from 1 to 33 wt.-%, preferably from 3 to 30 wt.-%, preferably from 5 to 25 wt.-%, preferably from 7 to 20 wt.-%, preferably from 8 to 15 wt.-% and
optionally, polymer(s) A1 is (are) branched polymer(s), wherein at least one polymer A1, preferably each polymer A1, has a degree of branching (DB) of at least 0.05, preferably from 0.05 to 0.99, more preferably from 0.05 to 0.9, preferably from 0.1 to 0.8, preferably from 0.25 and 0.60, preferably from 0.30 and 0.50.

Polyalkyleneimine(s):

Optionally polymer(s) A1 comprise(s) at least one polyalkyleneimine or consist(s) of one or more polyalkyleneimine(s). Preferably, polymer(s) A1 comprise(s) or consist(s) of polyethylenimine(s).

Polylalkyleneimine(s) may be polymer(s) with —N—CH$_2$—R—N— structural elements.

Polyalkyleneimine(s) may be (an) alkyleneimine homopolymer(s) with one specific —N—CH$_2$—R—N— structural element or (a) copolymer(s) with different N—CH$_2$—R—N structural elements. R may be —CH$_2$— or other alkylene groups like —CH$_2$—CH$_2$—, —CH$_2$—CH$_2$—CH$_2$—, —CH(CH$_3$)—. Preferably R is —CH$_2$—.

The total weight-average molecular weight $M_{w,total}$ of the polyalkyleneimine(s) of polymer(s) A1 may be from 800 to 100,000 g/mol, preferably from 800 to 70,000 g/mol, preferably from 800 to 50,000 g/mol, more preferably from 1,000 to 20,000 g/mol and most preferably from 1,400 to 20,000 g/mol and optionally the weight-average molecular weight of at least one of the polyalkylenemines, preferably each polyalkylenemine, of polymer(s) A1 may be from 800 to 100,000 g/mol, preferably from 800 to 70,000 g/mol, preferably from 800 to 50,000 g/mol, preferably from 1,000 to 20,000 g/mol and most preferably from 1,400 to 20,000 g/mol and optionally the polyalkyleneimine(s) is(are) branched polyalkyleneimine(s), wherein optionally at least one branched polyalkyleneimine, preferably each branched polyalkyleneimine, has a degree of branching (DB) of at least 0.05, preferably 0.05 to 0.99, preferably 0.1 to 0.9, particularly preferably 0.1 to 0.5 and optionally the polyalkyleneimine(s) has (have) a $NC_{ps}$ from 3 to 33 wt.-%, preferably from 5 to 20 wt.-%, preferably from 7.5 to 17.5 wt.-% and optionally at least one polyalkyleneimine, more preferably each polyalkyleneimine, has a $NC_{ps}$ from 3 to 33 wt.-%, preferably from 5 to 20 wt.-%, preferably from 7.5 to 17.5 wt.-%.

The total weight-average molecular weight $M_{w,total}$ of the polyethyleneimine(s) of polymer(s) A1 may be from 800 to 100,000 g/mol, preferably from 800 to 70,000 g/mol, preferably from 800 to 50,000 g/mol, preferably from 1,000 to 20,000 g/mol and most preferably from 1,400 to 20,000 g/mol and optionally the weight-average molecular weight of at least one of the polyethyleneimine(s), preferably of each polyethyleneimine, of polymer(s) A1 may be from 800 to 100,000 g/mol, preferably from 800 to 70,000 g/mol, preferably from 800 to 50,000 g/mol, preferably from 1,000 to 20,000 g/mol and most preferably from 1,400 to 20,000 g/mol
and optionally the polymer(s) A1 is(are) branched polyethyleneimine(s), wherein optionally at least one, preferably each branched polyethyleneimine, of polymer(s) A1 has a degree of branching (DB) of at least 0.05, preferably 0.05 to 0.99, preferably 0.1 to 0.9, particularly preferably 0.1 to 0.5 and optionally the polyethyleneimine(s) has (have) a $NC_{ps}$ from 5 to 33 wt.-%, preferably from 7.5 to 20 wt.-%, preferably from 10 to 17.5 wt.-% and optionally at least one polyethyleneimine(s), preferably each polyethyleneimine, has a $NC_{ps}$ from 5 to 33 wt.-%, preferably from 7.5 to 20 wt.-%, preferably from 10 to 17.5 wt.-%.

Polyalkyleneimine(s) can be prepared by catalytic polytransamination of diamines and/or triamines, preferably diamines (cf. e.g. WO201522186). Such diamines or triamines are linear, branched or cyclic aliphatic diamines or triamines. Suitable diamines are 1,2-ethylenediamine, 1,2-propylenediamine, 1,3-proplylenediamine, butylenediamine (for example 1,2- or 1,4-butylenediamine), diaminopentane (for example 1,2- or 1,5-diaminopentane), diaminohexane (for example 1,2- or 1,6-diaminohexane), diaminoheptane (for example 1,2- or 1,7-diaminoheptane), diaminooctane (for example 1,2- or 1,8-diaminooctane), diaminononane (for example 1,2- or 1,9-diaminononane), diaminodecane (for example 1,2- or 1,10-diaminodecane), diaminoundecane (for example 1,2- or 1,11-diaminoundecane), diaminododecane (for example 1,2- or 1,12-diaminododecane, bis-(3-aminopropyl)amine, bis-(2-aminoethyl)amine, N-(2-Aminoethyl)-1,3-propylenediamine, bis-N-(2-aminoethyl)-1,3-propylenediamine, N,N'-Bis-(3-aminopropyl)-1,2-ethylenediamine, N,N-Bis-(3-aminopropyl)-1,2-ethylenediamine, tris-(aminopropyl)amine, tris(aminoethyl)amine or mixtures thereof, preferably 1,2-ethylenediamine, 1,3-proplylenediamine, 1,4-butylenediamine or mixtures thereof.

Polyethyleneimine can be prepared by acid-catalyzed polymerization of ethylenimine and may be obtained as an aqueous solution having solid contents of from 20 to 90 wt.-%, preferably from 40 to 70 wt. %, of polyethyleneimine (U. Steuerle, R. Feuerhake, Ullmann's encyclopedia of Industrial Chemistry, Chapter "Aziridines", Wiley-VCH, 2006).
Polyamide(s):

Optionally the polymer(s) A1 comprise(s) at least one polyamide or consist(s) of one or more polyamide(s).

Polyamides are made by the formation of amide bonds that link two or more monomer molecules together. The starting material may either comprise AB-monomers with an amine and a carboxyl group in one molecule or AA-monomers containing two amine groups and BB-monomers containing two carboxyl groups. The AB-monomers can be amides themselves (usually in the form of a cyclic lactam such as caprolactam). The starting material may also comprise monomers with more than two functional groups, e.g. $A_2B$-monomers with two amine groups and one carboxyl groups, or $AB_2$-monomers with one amine group and two carboxyl groups.

Optionally polymer(s) A1 may comprise at least one polyamide, which has primary and/or secondary amine groups.

The polyamide may be a polymerization product of
i) amino acids, preferably amino acids comprising at least two amino groups, and/or
ii) amines comprising at least two amino groups, wherein the amines are no amino acids, and amino acids, and/or
iii) amines comprising at least two amino groups, wherein the amines are no amino acids, and di- and/or tricarboxylic acids, which are preferably no amino acid(s), and optionally amino acids, and/or
iv) at least two compounds defined in i) to iii).

Section iv) preferably refers to block or graft copolymers made of the monomers defined in sections i) to iii).

According to this invention the term polyamide also includes polyamide derivatives, which may be obtained by modification of the polyamide after polymer synthesis.

The modification of the polyamide may be performed by reaction with
i) alkyl- or alkenylcarboxylic acids, such as, for example, octanoic acid, nonanoic acid, decanoic acid, dodecanoic acid, hexadecenoic acid, stearic acid, oleic acid, linoleic acid, linolenic acid or their Li, Na, K, Cs, Ca or ammonium salts, and/or
ii) polyalkylene oxides which are terminated by one or more amino groups and/or acid groups, preferably polyethylene oxides, polypropylene oxides and/or polyethylene-propylene oxide, and/or
iii) alkylene oxides, such as ethylene oxide, propylene oxide or butylene oxide, and/or
iv) lactones, e.g. epsilon-caprolactone, delta-valerolactone, gamma-butyrolactone, and/or
v) alcohols, such as alkanole, for example oleyl alcohol.

The polymerization may not be proceeded until full conversion. Therefore, monomers, e.g. amines comprising at least 2 amino groups and/or amino acids and/or dicarboxylic acids and/or tricarboxylic acids, may be present in the polymer(s) A1 after synthesis of the polymer(s) A1 by polymerization. Each polymer A1 may contain less than 15 wt.-% monomers, more preferably less than 10 wt.-% monomers, more preferably less than 8 wt.-% monomers based on the total weight of the polymer A1 in polymer(s) A1. The weight amount of monomers is calculated based on total weight of each polymer A1 including its monomers. The monomers may be present as a result of incomplete conversion of the monomers in the polymerization or may be added after polymerization. Preferably, no monomers are added after finishing the polymerization reaction.

Preferred polyamides according to the present invention are poly(amino acid)s, e.g. synthetic poly(amino acid)s natural poly(amino acid)s, polypeptides, proteins or mixtures thereof. Poly(amino acid)s are produced by polymerization of amino acids. Poly(amino acid)s can be obtained by chemical synthesis or by biosynthesis in living organisms. In particular proteins may be obtained by biosynthesis in living organisms. Polypeptides may be obtained by hydrolysis of proteins.

Optionally polyamides of polymer(s) A1 has (have) a total weight-average molecular weight $M_{w,total}$ in the range from 800 to 50,000 g/mol, preferably 800 to 20,000 g/mol, preferably 800 g/mol to 10,000 g/mol, preferably 1,500 g/mol to 10,000 g/mol, preferably 1,500 g/mol to 5,000 g/mol, preferably 1,000 g/mol to 7,500 g/mol, preferably 1,150 g/mol to 5,000 g/mol, more preferably 1,300 g/mol to 3,000 g/mol and optionally at least one polyamide of polymer(s) A1, preferably each polyamide of polymer(s) A1, has a weight-average molecular weight in the range from 800 to 50,000 g/mol, preferably 800 to 20,000 g/mol, preferably 800 g/mol to 10,000 g/mol, preferably 1,500 g/mol to 10,000 g/mol, preferably 1,500 g/mol to 5,000 g/mol, preferably 1,000 g/mol to 7,500 g/mol, preferably 1,150 g/mol to 5,000 g/mol, more preferably 1,300 g/mol to 3,000 g/mol and optionally at least one polyamide of polymer(s) A1, preferably each polyamide of polymer(s) A1, has a degree of branching (DB) of at least 0.05, preferably 0.05 to 0.99, preferably 0.1 to 0.9, particularly preferably 0.1 to 0.5 and optionally polymer(s) A1 comprise(s) at least 50 wt.-%, preferably at least 60 wt.-%, preferably at least 70 wt.-%, preferably at least 80 wt.-%, preferably at least 90 wt.-%, preferably at least 95 wt.-%, preferably at least 98 wt.-%, preferably at least 99 wt.-%, preferably at least 99.5 wt.-%, most preferably 100 wt.-% polyamides, based on the total weight of the polymer(s) A1.

Poly(Amino Acid)(s):

Optionally the polymer(s) A1 comprise(s) at least one or consist(s) of at least one poly(amino acid) which is a polymerization product of amino acids and optionally other monomers selected from the group consisting of
- a) amines comprising at least two amino groups, wherein the amines are no amino acids, and
- b) di and/or tricarboxylic acids, which are preferably no amino acid(s), wherein at least 50 wt.-%, preferably at least 75 wt.-%, preferably at least 85 wt.-%, preferably at least 90 wt.-%, preferably at least 95 wt.-%, preferably at least 97.5 wt.-%, preferably at least 99 wt.-%, preferably 100 wt.-% amino acids, are used as monomers for the polymerization reaction based on total amount of monomers.

According to this invention the term poly(amino acid)s may also include poly(amino acid) derivatives, which may be obtained by modification of the poly(amino acid) after polymer synthesis.

The modification of poly(amino acid)s may be performed by reaction with
- i) alkyl- or alkenylcarboxylic acids, such as for example octanoic acid, nonanoic acid, decanoic acid, dodecanoic acid, hexadecenoic acid, stearic acid, oleic acid, linoleic acid and/or linolenic acid and/or or their Li, Na, K, Cs, Ca or ammonium salts, and/or
- ii) polyalkylene oxides which are terminated by amino groups and/or acid groups and have a functionality of one, two or more, preferably polyethylene oxides, polypropylene oxides and/or polyethylene-propylene oxide, and/or
- iii) alkylene oxides, such as ethylene oxide, propylene oxide and/or butylene oxide and/or
- iv) lactones, e.g. epsilon-caprolactone, delta-valerolactone, gamma-butyrolactone and/or
- v) alcohols, such as alkanole, for example oleyl alcohol.

Amino acid(s) mean organic compounds comprising at least one primary amine (—NH$_2$) and at least one carboxyl (—COOH) functional groups. The amino acid(s) may be lysine, histidine, isoleucine, leucine, methionine, phenylalanine, threonine, tryptophan, valine, arginine, aspartic acid, glutamic acid, serine, asparagine, glutamine, cysteine, selenocysteine, glycine, alpha-alanine, beta-alanine, tyrosine, gamma-aminobutyric acid, epsilon-aminocaproic acid, ornithine, diaminopimelic acid, 2,3-diaminopropionic acid, 2,4-diaminobutyric acid or mixtures thereof. The amino acids can be used in their L- or D- or racemic form. The amino acids may also be used in their cyclic lactam form, e.g. epsilon-caprolactam.

Preferred amino acids which are used for the polymerization reaction are diamino acids comprising two amine groups (—NH$_2$) and at least one carboxyl (—COOH) functional group. Such diamino acids may be ornithine, diaminopimelic acid, 2,3-diaminopropionic acid, 2,4-diaminobutyric acid, and/or lysine, preferably lysine, more preferably L-lysine. Although they are sometimes named as diamino acids, according to this invention asparagine and glutamine are not included in the group of diamino acids, since the second functional group is an amide (CO—NH$_2$) and not an amine (—NH$_2$).

Poly(amino acid)s may be formed by polymerization of amino acids with one amine group and amino acids with two or more amino groups, e.g. diamino carboxylic acids. Polymer(s) A1 may comprise or consist of one or more poly(amino acid)s.

Optionally at least 15 g of, preferably at least 30 g, preferably at least 60 g, preferably at least 90 g of diamino carboxylic acid(s), preferably lysine, are used for the polymerization of 100 g polymer(s) A1. Optionally only diamino carboxylic acids, preferably lysine, are used the preparation of polymer(s) A1.

Poly(amino acid)s may contain less than 15 wt.-% amino acid monomers, more preferably less than 10 wt.-% amino acid monomers, more preferably less than 8 wt.-% amino acid monomers based on the total weight of poly(amino acid)s. The weight amount of monomers is calculated based on total weight of poly(amino acid)s including its monomers.

Optionally polymer(s) A1 comprise at least 50 wt.-%, preferably at least 60 wt.-%, preferably at least 70 wt.-%, preferably at least 80 wt.-%, preferably at least 90 wt.-%, preferably at least 95 wt.-%, preferably at least 98 wt.-%, preferably at least 99 wt.-%, preferably at least 99.5 wt.-%, most preferably 100 wt.-% poly(amino acid)s, based on the total weight of the polymer(s) A1.

Optionally poly(amino acid)(s) of polymer(s) A1 has (have) a total weight-average molecular weight $M_{w,total}$ in the range from 800 to 20,000 g/mol, preferably 800 g/mol to 10,000 g/mol, preferably 1,500 g/mol to 10,000 g/mol, preferably 1,500 g/mol to 5,000 g/mol, preferably 1,000 g/mol to 7,500 g/mol, preferably 1,150 g/mol to 5,000 g/mol, more preferably 1,300 g/mol to 3,000 g/mol and optionally at least one poly(amino acid) of polymer(s) A1, preferably each poly(amino acid) of polymer(s) A1, has a weight-average molecular weight in the range from 800 to 20,000 g/mol, preferably 800 g/mol to 10,000 g/mol, preferably 1,500 g/mol to 10,000 g/mol, preferably 1,500 g/mol to 5,000 g/mol, preferably 1,000 g/mol to 7,500 g/mol, preferably, 1,150 g/mol to 5,000 g/mol, more preferably 1,300 g/mol to 3,000 g/mol, and optionally at least one poly(amino acid) of polymer(s) A1, preferably each poly(amino acid) of polymer(s) A1 has a degree of branching (DB) of from 0.2 to 0.7, preferably from 0.25 to 0.60, preferably from 0.30 to 0.50 and optionally the polymer(s) A1 comprise at least 50 wt.-%, preferably at least 60 wt.-%, preferably at least 70 wt.-%, preferably at least 80 wt.-%, preferably at least 90 wt.-%, preferably at least 95 wt.-%, preferably at least 98 wt.-%, preferably at least 99 wt.-%, preferably at least 99.5 wt.-%, most preferably 100 wt.-% poly(amino acid)s, based on the total weight of the polymer(s) A1.

Polylysine(s):

Preferably, polymer(s) A1 comprise(s) at least one polylysine or consist(s) of one or more polylysine(s), which is (are)

a polymerization product of monomer lysine, preferably L-lysine, and optionally other monomers selected from the group consisting of
  a) amino acids, preferably comprising at least two amino groups,
  b) amines comprising at least two amino groups, wherein the amines are no amino acids, and
  c) di and/or tricarboxylic acids, which are preferably no amino acids,
wherein at least 50 wt.-%, preferably at least 75 wt.-%, preferably at least 85 wt.-%, preferably at least 90 wt.-%, preferably at least 95 wt.-%, preferably at least 97.5 wt.-%, preferably at least 99 wt.-%, preferably 100 wt.-% lysine, is used as monomer for the polymerization reaction based on total amount of monomers.

Polylysine consist of dimers (n=2), trimers (n=3), oligomers (n=4-10) and macromolecules (n>10)—wherein n is the number of monomers which have been reacted to form the dimers, trimers, oligomers and macromolecules—and monomers. These monomers can be present either due to incomplete conversion of the monomers during the polymerization reaction or due to an addition of additional monomers after finishing the polymerization reaction, wherein the additional monomers are selected from the group of the monomers, which have been used for the polymerization reaction. Preferably, no monomers are added after finishing the polymerization reaction.

Optionally polymer(s) A1 comprise(s) or consist(s) of one or more polylysine(s), more preferably poly-L-lysine(s). Preferably, the polymer(s) A1 comprise(s) at least 50 wt.-%, preferably at least 60 wt.-%, preferably at least 70 wt.-%, preferably at least 80 wt.-%, preferably at least 90 wt.-%, preferably at least 95 wt. %, preferably at least 98 wt.-%, preferably at least 99 wt.-%, preferably at least 99.5 wt.-%, most preferably 100 wt.-% polylysine(s), based on the total weight of the polymer(s) A1. For the sake of clarity polylysines means different polylysines, e.g. with different weight-average molecular weight and/or different degree of branching.

Optionally polymer(s) A1 comprise(s) polylysine(s) or consist(s) of polylysine(s), wherein polylysine(s) has (have) a total weight-average molecular weight $M_{w,total}$ in the range from 800 to 20,000 g/mol, preferably 800 g/mol to 10,000 g/mol, preferably 1,500 g/mol to 10,000 g/mol, preferably 1,500 g/mol to 5,000 g/mol, preferably 1,000 g/mol to 7,500 g/mol, preferably, 1,150 g/mol to 5,000 g/mol, more preferably 1,300 g/mol to 3,000 g/mol.

Preferably, polymer(s) A1 comprise(s) polylysine(s) or consist(s) of polylysine(s), wherein polylysines(s) has (have) a total weight-average molecular weight $M_{w,total}$ in the range from 800 to 20,000 g/mol, preferably 800 g/mol to 10,000 g/mol, preferably 1,500 g/mol to 10,000 g/mol, preferably 1,500 g/mol to 5,000 g/mol, preferably 1,000 g/mol to 7,500 g/mol, preferably, 1,150 g/mol to 5,000 g/mol, more preferably 1,300 g/mol to 3,000 g/mol and optionally at least one polylysine of polymer(s) A1, preferably each polylysine of polymer(s) A1, has (have) a weight-average molecular weight in the range from 800 to 20,000 g/mol, preferably 800 g/mol to 10,000 g/mol, preferably 1,500 g/mol to 10,000 g/mol, preferably 1,500 g/mol to 5,000 g/mol, preferably 1,000 g/mol to 7,500 g/mol, preferably 1,150 g/mol to 5,000 g/mol, more preferably 1,300 g/mol to 3,000 g/mol.

Lysine has two possibilities to react during polymerization. Either the α-NH$_2$ or the ε-NH$_2$ can react with the carboxylic acid. Therefore, two linear polylysine types exist, i.e. α-polylysine or the ε-polylysine. Polymerisation can also performed in a manner, that both α-NH$_2$ and the ε-NH$_2$ react with the carboxylic acid group to form both α-linkages and ε-linkages. Preferably, the polylysine is a branched polylysine. Preferred polylysine(s) as used according to the present invention have more ε-linkages than α-linkages. Preferably, the ratio of ε-linkages to α-linkages is between 1.0:1 and 6.0:1, preferably between 1.25:1 and 4.0:1, preferably between 1.5:1 and 3.0:1. This ratio can be determined by integration of the corresponding signals in the $^1$H-NMR spectra of the polylysines.

Polylysine(s) may contain less than 15 wt.-% lysine monomers, more preferably less than 10 wt.-% lysine monomers, more preferably less than 8 wt.-% lysine monomers based on the total weight of Polylysine(s).

Each polylysine may contain less than 15 wt.-% lysine monomers, more preferably less than 10 wt.-% lysine monomers, more preferably less than 8 wt.-% lysine monomers based on the total weight of said polylysine.

The branched polylysine may, for example, have a degree of branching (DB) from 0.2 to 0.7, preferably from 0.25 to 0.60, preferably from 0.30 to 0.50.

In case component A comprises one polylysine, the $NC_{ps}$ of the polylysine may be from 5 to 12.5 wt.-%, more preferably from 7.5 to 12.5 wt. %, more preferably from 8.5 to 12 wt.-%, most preferably from 9 to 11.5 wt.-%.

In case component A comprise two or more polylysines, the $NC_{ps}$ of polylysines in total may be from 5 to 12.5 wt.-%, more preferably from 7.5 to 12.5 wt. %, more preferably from 8.5 to 12 wt.-%, most preferably from 9 to 11.5 wt.-%, and optionally the $NC_{ps}$ of at least one polylysine, preferably of each polylysine, may be from 5 to 12.5 wt.-%, more preferably from 7.5 to 12.5 wt. %, more preferably from 8.5 to 12 wt.-%, most preferably from 9 to 11.5 wt.-%.

Optionally polymer(s) A1 comprise(s) or consist(s) of polylysine(s), wherein polylysine(s) has (have) a total weight-average molecular weight $M_{w,total}$ in the range from 800 to 20,000 g/mol, preferably 800 g/mol to 10,000 g/mol, preferably 1,500 g/mol to 10,000 g/mol, preferably 1,500 g/mol to 5,000 g/mol, preferably 1,000 g/mol to 7,500 g/mol, preferably, 1,150 g/mol to 5,000 g/mol, more preferably 1,300 g/mol to 3,000 g/mol and optionally at least one polylysine, preferably each polylysine, has a weight-average molecular weight in the range from 800 to 20,000 g/mol, preferably 800 g/mol to 10,000 g/mol, preferably 1,500 g/mol to 10,000 g/mol, preferably 1,500 g/mol to 5,000 g/mol, preferably 1,000 g/mol to 7,500 g/mol, preferably, 1,150 g/mol to 5,000 g/mol, more preferably 1,300 g/mol to 3,000 g/mol and optionally at least one polylysine, preferably each polylysine, has a degree of branching (DB) of between 0.2 and 0.7, preferably 0.25 and 0.60, preferably between 0.30 and 0.50 and optionally the polylysine(s) has (have) $NC_{ps}$ from 5 to 12.5 wt.-%, more preferably 7.5 to 12.5 wt. %, more preferably from 8.5 to 12 wt.-%, most preferably from 9 to 11.5 wt.-% and optionally at least one polylysine, preferably each polylysine, has a $NC_{ps}$ from 5 to 12.5 wt.-%, more preferably 7.5 to 12.5 wt. %, more preferably from 8.5 to 12 wt.-%, most preferably from 9 to 11.5 wt.-%.

The production of polylysine is generally known and may be performed as e.g. described in WO2016062578, preferably in claim 1, most preferably in any Examples 4 to 10. Another method for producing polylysine from lysine salts is described in WO2007060119.

According to this invention the term polylysine(s) also include polylysine derivatives, which may be obtained by modification of the polylysine after polymer synthesis.

The modification of polylysine may be performed by reaction with
i) alkyl- or alkenylcarboxylic acids, such as for example octanoic acid, nonanoic acid, decanoic acid, dodecanoic acid, hexadecenoic acid, stearic acid, oleic acid, linoleic acid and/or linolenic acid and/or or their Li, Na, K, Cs, Ca or ammonium salts, and/or
ii) polyalkylene oxides which are terminated by amino groups and/or acid groups and have a functionality of one, two or more, preferably polyethylene oxides, polypropylene oxides and/or polyethylene-propylene oxide, and/or
iii) alkylene oxides, such as ethylene oxide, propylene oxide and/or butylene oxide and/or
iv) lactones, e.g. epsilon-caprolactone, delta-valerolactone, gamma-butyrolactone and/or
v) alcohols, such as alkanole, for example oleyl alcohol.

Amines comprising at least two amino groups:

Optionally amines comprising two amino groups, which are suitable for use as monomers in the polymerization to polymer A1, are selected from the group consisting of 1,2-ethylenediamine, 1,2-propylenediamine, 1,3-proplylenediamine, butylenediamine (for example 1,2- or 1,4-butylenediamine), diaminopentane (for example 1,2- and/or or 1,5 diaminopentane), diaminohexane (for example 1,2- and/or 1,6-diaminohexane), diaminoheptane (for example 1,2- and/or 1,7-diaminoheptane), diaminooctane (for example 1,2- and/or 1,8-diaminooctane), diaminononane (for example 1,2- and/or 1,9-diaminononane), diaminodecane (for example 1,2- and/or 1,10-diaminodecane), diaminoundecane (for example 1,2- and/or 1,11-diaminoundecane), diaminododecane (for example 1,2- and/or 1,12-diaminododecane, cyclo-hexylenediamine, bis-(3-aminopropyl)amine, bis-(2-aminoethyl)amine, N-(2-aminoethyl)-1,3-propylenediamine, bis-N-(2-aminoethyl)-1,3-propylenediamine, N,N'-bis-(3-aminopropyl)-1,2-ethylenediamine, N,N'-bis-(3-aminopropyl)-1,4-butylenediamine N,N-bis-(3-aminopropyl)-1,2-ethylenediamine, tris-(aminopropyl)amine, tris-(aminoethyl)amine, amine-terminated polyoxyalkylene polyols (so-called jeffamines), amine-terminated polytetramethylene glycols and mixtures thereof.

Preferred amines comprising two amino groups are selected from the group consisting of: 1,2-ethylenediamine, 1,3-propylenediamine, bis-(3-aminopropyl)amine, N-(2-aminoethyl)-1,3-propylenediamine, bis-(2-aminoethyl)amine, bis-N-(2-aminoethyl)-1,3-propylenediamine, N,N'-bis-(3-aminopropyl)-1,2-ethylenediamine, N,N-bis-(3-aminopropyl)-1,2-ethylenediamine and mixtures thereof. Most preferred are 1,2-ethylenediamine, 1,3-propylenediamine, N-(2-aminoethyl)-1,3-propylenediamine, N,N'-Bis-(3-aminopropyl)-1,2-ethylenediamine and mixtures thereof.

Di- and Tricarboxylic Acid(s):

Suitable dicarboxylic acids for use as monomers in the polymerization to polymer A1 are oxalic acid, ma-Ionic acid, succinic acid, glutaric acid, adipic acid, pimelic acid, suberic acid, azelaic acid, sebacic acid, undecane-1,11-dicarboxylic acid, dodecane-1,12-dicarboxylic acid, maleic acid, fumaric acid, malic acid, cis- and/or trans-cyclohexane-1,2-dicarboxylic acid, cis- and/or trans-cyclohexane-1,3-dicarboxylic acid, cis- and/or trans-cyclohexane-1,4-dicarboxylic acid, cis- and/or trans-cyclopentane-1,2-dicarboxylic acid, cis- and/or trans-cyclopentane-1,3-dicarboxylic acid or mixtures thereof, preferably malonic acid, succinic acid, glutaric acid and/or adipic acid.

Suitable tricarboxylic acids or tetracarboxylic acids for use as monomers in the polymerization to polymer A1 are trimesic acid, trimellitic acid, pyromellitic acid, butanetricarboxylic acid, naphthalene tricarboxylic acid and cyclohexane-1,3,5-tricarboxylic acid, citric acid or mixtures thereof, preferably citric acid. Preferred are dicarboxylic acids.

Optionally the polymer(s) A1 used according to the present invention comprises at least one or consists of a polymerization product of
i) 1,2-ethylenediamine, 1,3-propylenediamine, bis-(3-aminopropyl)amine, bis-(2-aminoethyl)amine, N-(2-Aminoethyl)-1,3-propylenediamine, bis-N-(2-aminoethyl)-1,3-propylenediamine, N,N'-Bis-(3-aminopropyl)-1,2-ethylenediamine, N,N-Bis-(3-aminopropyl)-1,2-ethylenediamine, or mixtures thereof and
ii) adipic acid, succinic acid or mixtures thereof.

Further Components A2 and A3:

Component A comprises polymer(s) A1 and optionally comprises component A2 and comprises optionally component A3 which is water. Preferably, Component A comprises polymer(s) A1 and comprises component A3 which is water and optionally comprises further component A2. Polymer(s) A1 and component A2 do not comprise water. Component A3 which is water may be used to dissolve or disperse polymer(s) A1 and/or component A2.

Component A2 may comprise or consist of one or more substances selected from the group consisting of polyols, urea, urea derivatives like ethylene urea, 1,3-dimethylurea, lignin, co-solvents, rheology modifiers, and other auxiliaries like biocides, dyes, pigments, flame retardants, and mixtures thereof.

Polyols may be selected from the group consisting of ethylene glycol, diethylene glycol, propylene glycol, dipropylene glycol, butanediol, glycerine, trimethylolpropane, triethanolamine, pentaerythritol, sorbitol, and mixtures thereof. Other suitable polyols are biopolyols, such as polyols derived from soya oil, rapeseed oil, castor oil, sunflower oil or mixtures thereof. Other suitable polyols are polyether polyols which can be obtained via polymerization of cyclic oxides, for example ethylene oxide, propylene oxide, butylene oxide, or tetrahydrofuran in the presence of polyfunctional initiators or mixtures thereof.

Lignin may have an average molecular weight of 2.000-50.000 g/mol.

Lignin is a high-molecular weight, aromatic compound found in plants comprising hydroxylated and methoxylated phenylpropene units like 4-hydroxycinnamic alcohol (p-cumaryl alcohol), coniferyl alcohol and/or sinapyl alcohol, (so-called monolignols) units.

The lignin to be used according to the present invention may be obtained e.g. by the sulfate process (Kraft lignin), soda process and/or organosolv-process (Organosolv lignin). Processes to obtain lignin are e.g. described in U.S. Pat. No. 4,507,172, CA2256923, EP3156409, WO2013/070130, DE3901662, WO2012/027767 and/or WO2006/038863.

Lignin may be also precipitated as lignin solid out of a Kraft pulp mill "black liquor" stream by acidification and filtration (e.g. by the Lignoboost process described in US20170355723 or equivalent approaches). Preferably, this type of lignin is used according to the present invention and referred to as Kraft lignin. Black liquor is the aqueous basic solution of the Kraft-pulping process after separation of the cellulosic pulp. It comprises besides dissolved lignin inorganic cooking salts and degraded sugar components from the original biomass, like e.g. acetic acid, diverse sugaracids, etc. (Bajpai, Pratima. (2018). Biermann's Handbook of Pulp and Paper—Raw Material and Pulp Making, Volume 1 and 2 (3rd Edition)—12.8.5 Green Liquor, Chemical Recovery. (pp. 332). Elsevier).

Co-solvents may be selected from alcohols, like ethanol, and/or carbonates, like diethyl carbonate.

Rheology modifiers may be selected from the group of polymeric thickeners, e.g. carboxy-methylcellulose and/or polyvinylalcohol.

Component A may comprise
- 20 to 80 wt.-%, preferably 30 to 70 wt.-%, preferably 40 to 65 wt.-% polymer(s) A1, and
- optionally 0 to 50 wt.-%, preferably 0 to 45 wt.-%, preferably 0 to 40 wt.-%, preferably 0 to 30 wt.-%, preferably 0 to 20 wt.-%, preferably 0 to 10 wt.-%, preferably 0 to 5 wt.-% component A2, and
- 80 to 20 wt.-%, preferably 30 to 70 wt.—preferably 35 to 60 wt.-% component A3 which is water, based on the weight amount of Component A, wherein the weight amount of all polymer(s) A1, components A2 and A3 is selected such that the total weight of the sum of the polymers (s) A1, components A2 and A3 does not exceed 100 wt.-% or is preferably 100 wt.-%, wherein preferably component A2 is urea and/or urea derivative(s), more preferably urea.

Component B

Component B comprises component B1 which is 1,3-dihydroxyacetone, glycolaldehyde, glyceraldehyde or any mixture thereof and optionally comprises component B2 and optionally component B3 which is water. Preferably, Component B comprises component B1 and comprises component B3 which is water and optionally comprises component B2. Component B1 and component B2 do not comprise water. Component B3 which is water may be used to dissolve or disperse component B1 and/or component B2.

Component B may comprise 20 to 80 wt.-%, preferably 30 to 75 wt.-%, preferably 40 to 70 wt.-% of component B1 based on the total weight of component B.

Mixtures of 1,3-dihydroxyacetone, glycolaldehyde and glyceraldehyde may be prepared by a triazolium salts catalyzed condensation reaction of formaldehyde (EP0786456A2).

1,3-dihydroxyacetone may be prepared by thiazolium ylide-catalyzed condensation of formaldehyde (EP0568872A1). Glycolaldehyde and Glyceraldehyde may be prepared from paraformaldehyde in ethylacetate in the presence of molecular sieves and nitrone (EP3080178A1).

Component B2 may comprise or consist of one or more substances selected from the group consisting of carbohydrates (excluding trioses), polyols, urea, urea derivatives like ethylene urea, 1,3-dimethylurea, organic acids, co-solvents, rheology modifiers, and/or other auxiliaries like biocides, dyes, pigments, flame retardants, and mixtures thereof. The organic acids may be e.g. lactic acid and/or formic acid.

Preferably, the component B does not comprise or consists of any other polymer except polymer(s) A1.

Polyols may be selected from the group consisting of ethylene glycol, diethylene glycol, propylene glycol, dipropylene glycol, butanediol, glycerine, trimethylolpropane, triethanolamine, pentaerythritol, sorbitol, and mixtures thereof. Other suitable polyols may be biopolyols, such as polyols derived from soya oil, rapeseed oil, castor oil, sunflower oil or mixtures thereof. Other suitable polyols may be polyether polyols which can be obtained via polymerization of cyclic oxides, for example ethylene oxide, propylene oxide, butylene oxide, or tetrahydrofuran in the presence of polyfunctional initiators or mixtures thereof.

Co-solvents may be selected from alcohols, like ethanol, and/or carbonates, like diethyl carbonate.

Rheology modifiers may be selected from the group of polymeric thickeners, e.g. carboxymethyl-cellulose.

Component B2 may comprise less than 60 wt.-%, preferably less than 50 wt.-%, preferably less than 40 wt.-%, preferably less than 30 wt.-%, preferably less than 20 wt.-%, preferably less than 10 wt.-%, preferably less than 5 wt.-%, preferably less than 2.5 wt.-%, preferably less than 1 wt.-%, pentoses, based on the total weight of component B1. Component B2 may comprise less than 60 wt.-%, preferably less than 50 wt.-%, preferably less than 40 wt.-%, preferably less than 30 wt.-%, preferably less than 20 wt.-%, preferably less than 10 wt.-%, preferably less than 5 wt.-%, preferably less than 2.5 wt.-%, preferably less than 1 wt.-%, carbohydrates, based on the total weight of component B1. Component B2 does preferably not comprise any pentose. Component B2 does preferably not comprise any carbohydrate. Carbohydrate means monosaccharides having the formula $C_nH_{2n}O_n$ (polyhydroxyaldehydes (aldoses) and/or polyhydroxyketones (ketoses)) and/or higher molecular compounds, which can be transformed to these monosaccharides by hydrolysis, like disaccharides having the formula $C_nH_{2n-2}O_{n-1}$, oligosaccharides and polysaccharides (e.g. starches). Preferably, carbohydrates are selected from the group consisting of monosaccharides, disaccharides, oligosaccharides, polysaccharides and mixtures thereof, more preferably from the group consisting of monosaccharides, disaccharides and mixtures thereof but excluding trioses. Component B2 may not comprise any pentose selected from the group consisting of ribose, arabinose, xylose, lyxose and mixtures thereof.

The carbohydrate component may be a monosaccharide in its aldose or ketose form or a mixture of different types, including a tetrose, a pentose, a hexose, or a heptose; or a polysaccharide; or combinations thereof. Preferred carbohydrate components are pentoses and/or hexoses. For example, when a tetrose serves as the carbohydrate component aldotetrose sugars, such as erythrose and/or threose may be utilized; and/or ketotetrose sugars, such as erythrulose, may be utilized. When a pentose serves as the carbohydrate component, aldopentose sugars, such as ribose, arabinose, xylose, and/or lyxose may be utilized; and/or ketopentose sugars, such as ribulose, arabulose, xylulose, and/or lyxulose, may be utilized. When a hexose serves as the carbohydrate component, aldohexose sugars, such as glucose (i.e., dextrose), mannose, galactose, allose, altrose, talose, gulose, and/or idose may be utilized; and/or ketohexose sugars, such as fructose, psicose, sorbose and/or tagatose, may be utilized. When a heptose serves as the carbohydrate component, a ketoheptose sugar such as sedoheptulose may be utilized. Other stereoisomers of such carbohydrate components not known to occur naturally are also contemplated to be useful as further component B2 of component B.

As mentioned above, the carbohydrate component may be a polysaccharide. For example, the carbohydrate component may be a polysaccharide with a low degree of polymerization, including, for example, molasses, starch hydrolysates, cellulose hydrolysates, or mixtures thereof. According to a specific example, the carbohydrate component is a starch hydrolysate, e.g. maltodextrin, or a mixture thereof.

Optionally the carbohydrate is selected from the group consisting of ribose, arabinose, xylose, lyxose, glucose (i.e., dextrose), mannose, galactose, allose, altrose, talose, gulose, idose, fructose, psicose, sorbose, sucrose and tagatose, as well as mixtures thereof. More preferably, the carbohydrate is selected from the group consisting of xylose, glucose (i.e. dextrose) and sucrose, as well as mixtures thereof.

Component B may comprise
20 to 80 wt.-%, preferably 30 to 75 wt.-%, preferably 40 to 70 wt.-% component B1, optionally 0 to 50 wt.-%, preferably 0 to 40 wt.-%, preferably 0 to 30 wt.-%, preferably 0 to 20 wt.-%, preferably 0 to 10 wt.-%, preferably 0 to 5 wt.-% component B2, and
20 to 80 wt.-%, preferably 25 to 70 wt.-%, preferably 30 to 60 wt.-% component B3 which is water, based on the total weight of component B, wherein the weight amounts of components B1, B2 and B3 are selected such that the total weight of the sum of components B1, B2 and B3 does not exceed 100 wt.-% or is preferably 100 wt.-%, wherein optionally
component B1 is a mixture of
1 to 30 wt.-% 1,3-dihydroxyacetone
10 to 50 wt.-% glycolaldehyde and
20 to 80 wt.-% glyceraldehyde
based on the total weight of component B1, wherein the weight amounts of 1,3-dihydroxyacetone, glycolaldehyde and glyceraldehyde are selected such that the total weight of the sum of 1,3-dihydroxyacetone, and glycolaldehyde is 100 wt. %, wherein component B2 is preferably urea and/or urea derivative(s), more preferably urea.

The binder composition according to the present invention may comprise urea as component A2 and/or B2, wherein preferably the binder composition comprises 0 to 70 wt.-%, preferably 10 to 60 wt.-%, more preferably 20 to 55 wt.-%, most preferably 25 to 50 wt.-% urea in total based on the total weight of the sum of components A1 and B1.

Optionally in the binder composition according to the present invention the number ratio of the sum of the primary and secondary amine groups of polymers A1 to the sum of the numbers of the aldehyde and keto groups of component B1 may be from 10:1 to 0.3:1, preferably 4:1 to 0.3:1, preferably from 4:1 to 0.5:1, more preferably from 3:1 to 1:1.

The binder composition according to the present invention may comprise
10 to 95 wt.-%, preferably 20 to 95 wt.-%, preferably 30 to 95 wt.-%, preferably 40 to 90 wt.-%, preferably 50 to 90 wt.-%, preferably 60 to 85 wt.-% preferably 70 to 85 wt.-% polymer(s) A1, based on the total weight of the sum of polymer(s) A1 and component B1. The binder composition according to the present invention may comprise 70 to 90 wt.-% polymer(s) A1, based on the total weight of the sum of polymer(s) A1 and component B1.

Optionally the binder composition according to the present invention comprises
10 to 95 wt.-%, preferably 20 to 95 wt.-%, preferably 30 to 95 wt.-%, preferably 40 to 90 wt.-%, preferably 50 to 90 wt.-%, preferably 60 to 85 wt.-% preferably 70 to 85 wt.-% polymer(s) A1, and 5 to 90 wt.-%, preferably 5 to 80 wt.-%, preferably 5 to 70 wt.-%, preferably 10 to 60 wt.-%, preferably 10 to 50 wt.-%, preferably 15 to 40 wt.-%, preferably 15 to 30 wt.-% component B1, based on the total weight of the sum of polymer(s) A1 and component B1, wherein the weight amounts of the polymer(s) A1 and component B1 are selected such that the total weight of the sum of polymer(s) A1 and component B1 is 100 wt.-%.

Optionally the binder composition according to the present invention comprises
preferably 50 to 90 wt.-%, preferably 60 to 85 wt.-% preferably 70 to 85 wt.-% polymer(s) A1, and 10 to 50 wt.-%, preferably 15 to 40 wt.-%, preferably 15 to 30 wt.-% component B1, based on the total weight of the sum of polymer(s) A1 and component B1, wherein the weight amounts of the polymer(s) A1 and component B1 are selected such that the total weight of the sum of polymer(s) A1 and component B1 is 100 wt.-%.

Component A may comprise
20 to 80 wt.-%, preferably 30 to 70 wt.-%, preferably 40 to 65 wt.-% polymer(s) A1, optionally 0 to 50 wt.-%, preferably 0 to 45 wt.-%, preferably 0 to 40 wt.-%, preferably 0 to 30 wt.-%, preferably 0 to 20 wt.-%, preferably 0 to 10 wt.-%, preferably 0 to 5 wt.-% component A2, 80 to 20 wt.-%, preferably 30 to 70 wt.-% preferably 35 to 60 wt.-% component A3, which is water based on the total weight of the sum of polymer(s) A1, components A2 and A3, wherein the weight amounts of polymer(s) A1, components A2 and A3 are selected such that the total weight of the sum of polymer(s) A1 and components A2 and A3 is 100 wt.-%, wherein component A2 preferably is urea and/or urea derivative(s), more preferably urea.

and component B may comprise
20 to 80 wt.-%, preferably 30 to 75 wt.-%, preferably 40 to 70 wt.-% component B1, optionally 0 to 50 wt.-%, preferably 0 to 45 wt.-%, preferably 0 to 40 wt.-%, preferably 0 to 30 wt.-%, preferably 0 to 20 wt.-%, preferably 0 to 10 wt.-%, preferably 0 to 5 wt.-% component B2, and from 20 to 80 wt.-%, preferably 25 to 70 wt.-%, preferably 30 to 60 wt.-% component B3 which is water, based on the total weight of the sum of components B1, B2 and B3, wherein the weight amounts of components B1, B2 and B3 are selected such that the total weight of the sum of components B1, B2 and B3 is 100 wt.-%, wherein component B2 preferably is urea and/or urea derivative(s), more preferably urea.

Optionally the binder composition according to the present invention comprises
a) component A comprising polymer(s) A1 having primary and/or secondary amino groups wherein polymer(s) A1 has(have) a $NC_{ps}$ of at least 1 wt.-% and
b) component B comprising component B1 which is 1,3-dihydroxyacetone and/or glycolaldehyde and/or glyceraldehyde and
c) optionally component C comprising functional additives, wherein the polymer(s) A1 has(have) a total weight average molecular weight $M_{w,total}$ of at least 800 g/mol and preferably at most 10,000 g/mol, preferably at least 1,500 g/mol and preferably at most 10,000 g/mol, preferably at least 1,500 g/mol and preferably at most 5,000 g/mol.

Functional additives are additives for the improvement of certain properties of the lignocellulose-based composite article, e.g. the water resistance and/or the resistance against microorganisms.

Component C may comprise or consist of:
Component C1 which is(are) (a) functional additive(s) and component C2 which is water
Component C2 which is water may be used to dissolve or disperse component C1.

The functional additive C1 may be selected from the group of hydrophobizing agents, such as paraffin, rheology modifiers, fillers, fungicides, biocides, flame retardants, pigments, dyes, or mixtures thereof.

One preferred component C is paraffin emulsion, in which paraffin (component C1) is emulsified in water (component C2).

Optionally the binder composition comprises 0 to 50 wt.-%, preferably 0 to 25 wt.-%, preferably 0 to 15 wt.-%, preferably 0 to 10 wt.-%, component C1 based on the total weight of the sum of polymer(s) A1 and component B1 and component C1.

The binder composition may comprise
- 20 to 80 wt.-%, preferably 30 to 70 wt.-%, preferably 40 to 65 wt.-% polymer(s) A1, optionally 0 to 50 wt.-%, preferably 0 to 45 wt.-%, preferably 0 to 40 wt.-%, preferably 0 to 30 wt.-%, preferably 0 to 20 wt.-%, preferably 0 to 10 wt.-%, preferably 0 to 5 wt.-% component A2,
- 80 to 20 wt.-%, preferably 30 to 70 wt.—preferably 35 to 60 wt.-% component A3, which is water, based on the total weight of the sum of polymer(s) A1 and components A2 and A3, wherein the weight amounts of the polymer(s) A1 and components A2 and A3 are selected such that the weight amount of the sum of polymer(s) A1, component(s) A2 and A3 is 100 wt.-%, wherein component A2 preferably is urea and/or urea derivative(s), more preferably urea and
- 20 to 80 wt.-%, preferably 30 to 75 wt.-%, preferably 40 to 70 wt.-% component B1, optionally 0 to 50 wt.-%, preferably 0 to 45 wt.-%, preferably 0 to 40 wt.-%, preferably 0 to 30 wt.-%, preferably 0 to 20 wt.-%, preferably 0 to 10 wt.-%, preferably 0 to 5 wt.-% component B2, and 20 to 80 wt.-%, preferably 25 to 70 wt.-%, preferably 30 to 60 wt.-% component B3 which is water, based on the total weight of the sum of components B1, B2 and B3, wherein the weight amounts of components B1, B2 and B3 are selected such that the total weight of the sum of components B1, B2 and B3 is 100 wt.-%, wherein component B2 preferably is urea and/or urea derivative(s), more preferably urea and
- 0 to 100-%, preferably 10 to 90 wt.-%, preferably 25 to 70 wt.-% component C1, 0 to 100 wt.-%, preferably 10 to 90 wt.-%, preferably 30 to 75 wt.-% component C2, which is water, based on the total weight of the sum of components C1 and C2, wherein the weight amounts of the components C1 and C2 are selected such that the total weight of the sum of components C1 and C2 is 100 wt.-%, wherein component C1 preferably is paraffin and optionally the binder composition according to the present invention comprises
- 10 to 95 wt.-%, preferably 20 to 95 wt.-%, preferably 30 to 95 wt.-%, preferably 40 to 90 wt.-%, preferably 50 to 90 wt.-%, preferably 60 to 85 wt.-% polymer(s) A1, more preferably 70 to 85 wt.-%, and
- 5 to 90 wt.-%, 5 to 80 wt.-%, preferably 5 to 70 wt.-%, preferably 10 to 60 wt.-%, preferably 10 to 50 wt.-%, preferably 15 to 40 wt.-%, preferably 15 to 30 wt.-% component B1, and
- 0 to 50 wt.-%, preferably 0 to 25 wt.-%, preferably 0 to 15 wt.-%, preferably 0 to 10 wt.-% component C1 based on the total weight of the sum of polymer(s) A1 and component B1 and component C1, wherein the weight amount of polymer(s) A1 and component B1 and component C1 is selected such that the total weight of the sum of polymer(s) A1 and component B1 and component C1 does not exceed 100 wt.-% or is 100 wt.-%, wherein preferably polymer(s) A1 comprises 70 wt.-% to 100 wt.-% polylysine(s) based on the total weight of polymer(s) A1, wherein optionally polylysine(s) has (have) a total weight-average molecular weight $M_{w,total}$ in the range of 800 to 10,000 g/mol, preferably 1000 to 7,500 g/mol, more preferably 1,400 g/mol to 5,000 g/mol, more preferably 1,500 to 5,000 g/mol, wherein optionally the binder composition according to the present invention comprises urea as component A2 and/or B2, wherein preferably the binder composition comprises 0 to 70 wt.-%, preferably 10 to 60 wt.-%, more preferably 20 to 55 wt.-%, most preferably 25 to 50 wt.-% urea in total based on the total weight of the sum of components A1 and B1.

Optionally the binder composition according to the present invention comprises
- 10 to 95 wt.-%, preferably 20 to 95 wt.-%, preferably 30 to 95 wt.-%, preferably 40 to 90 wt.-%, preferably 50 to 90 wt.-%, preferably 60 to 85 wt.-% polymer(s) A1, more preferably 70 to 85 wt.-%, and
- 5 to 90 wt.-%, 5 to 80 wt.-%, preferably 5 to 70 wt.-%, preferably 10 to 60 wt.-%, preferably 10 to 50 wt. %, preferably 15 to 40 wt.-%, preferably 15 to 30 wt.-% component B1, and
- 0 to 50 wt.-%, preferably 0 to 25 wt.-%, preferably 0 to 15 wt.-%, preferably 0 to 10 wt.-% component C1 based on the total weight of the sum of polymer(s) A1 and component B1 and component C1, wherein the weight amount of polymer(s) A1 and component B1 and component C1 is selected such that the total weight of the sum of polymer(s) A1 and component B1 and component C1 is 100 wt.-%.

The present invention also relates to a plastic material obtainable by reacting components A and B, in particular the above described binder composition. The binder composition according to the present invention may be used for the preparation of a plastic material obtained by mixing components A and B and optionally C and reacting the mixture. The mixture may be cured in a mold.

Alternatively, the curing may take place after incorporating the mixture into a matrix system. The matrix system may be a lignocellulosic or cellulosic scaffold with cavities, which can be filled with the mixed binder composition, such as wood beams, delignified wood beams, wood veneers, delignified wood veneers, wood particles, delignified wood particles, paper, cellulosic non-woven or other cellulosic or lignocellulosic materials. The matrix system may be formed before reacting the binder composition. Delignification may be performed by treatment with an aqueous solution of $H_2O_2$ and acetic acid as described in M. Frey, et al., ACS Appl. Mater. Interfaces, 2018, 20, page 5030 to 5037 or in WO 2018197222, or by treatment with an aqueous solution of NaOH and $Na_2SO_3$ as described in M. Zhu, et al., Adv. Mat. 2016, 28 page 5181 to 5187. The ratio between the matrix system and the plastic material may be between 95:5 and 25:75 by weight, preferably between 90:10 and 50:50 by weight, preferably between 85:15 and 60:40 by weight. Curing occurs at 20 to 200° C., preferably 50 to 180° C., more preferably 70 to 150° C. and optionally at a pressure of 1 to 100 bar, preferably 2 to 80 bar, preferably 3 to 60 bar.

Optionally the binder composition for the preparation of the plastic material comprises at least 70 wt.-%, preferably at least 80 wt.-%, preferably at least 90 wt.-%, preferably at least 95 wt.-%, preferably at least 97.5 wt.-%, preferably at least 99 wt.-%, most preferably 100 wt.-% of both components polymer(s) A1 and component B1 in total based on the total weight of the sum of polymer(s) A1, component A2, component B1, component B2 and component C1.

The present invention also relates to a composition kit comprising the above defined binder composition, wherein component A and component B and optionally component C are stored separately. The binder kit comprises two separate components A and B, which are mixed either before or during or after application to a plurality of lignocellulosic particles.

The present invention also relates to a reacted binder composition obtainable or obtained by reacting the components A and B, in particular the binder composition, according to the present invention. The present invention also relates to a reacted binder composition obtainable or obtained by reacting the binder composition according to the present invention.

The binder composition according to the present invention may be used as binder or adhesive for different materials in different shapes, such as mineral fibers (including slag wool fibers, stone wool fibers, glass fibers), aramid fibers, ceramic fibers, ceramic powder, metal fibers, metal powder, carbon fibers, polyimide fibers, polyester fibers, reyon fibers, cellulosic fibers, cellulosic sheets, cellulosic chips, cellulosic strands, cellulosic layers or lignocellulosic pieces.

Optionally the binder composition according to the present invention is used for lignocellulosic pieces, more preferably lignocellulosic particles, in particular wood particles.

A further aspect of the present invention relates to a lignocellulose-based composite article comprising:
a plurality of lignocellulosic pieces, and
the reacted binder composition as defined above.

The reacted binder composition preferably means a binder composition cured at 20 to 300° C., preferably 40 to 200° C., preferably 50 to 180° C., more preferably 70 to 150° C. and optionally at a pressure of 0.1 to 100 bar, preferably 1 to 100 bar, preferably 1 to 50 bar, preferably 1 to 25 bar. Preferably the curing reaction is a crosslinking reaction (preferably crosslinking of the polymer(s) A1 by reaction with 1,3-dihydroxyacetone, and/or glycolaldehyde and/or glyceraldehyde), wherein the temperature is the maximum temperature reached in the binder composition during the curing step.

The binder composition may be cured at 20 to 300° C., preferably 40 to 200° C., preferably 50 to 180° C., more preferably 70 to 150° C., while applying a high-frequency electrical field, and optionally at a pressure of 0.1 to 100 bar, preferably 1 to 100 bar, preferably 1 to 50 bar, preferably 1 to 25 bar. Preferably, a high-frequency electrical field is applied during pressing until 80 to 200° C., preferably 80 to 180° C., more preferably 90 to 150° C. and most preferably 100 to 150° C. is reached in the center of the mat.

The term "high-frequency electrical field" used herein designates and includes any kind of high-frequency electrical or electromagnetic field such as microwave irradiation or a high-frequency electrical field, which results after applying a high-frequency alternating voltage at a plate capacitor between two capacitor plates. Suitable frequencies for the high-frequency electrical field are in the range of from 100 kHz to 30 GHz, preferably 6 MHz to 3 GHz, more preferably 13 MHz to 41 MHz. Especially suitable and preferred are the respective nationally and internationally approved frequencies such as 13.56 MHz, 27.12 MHz, 40.68 MHz, 2.45 GHz, 5.80 GHz, 24.12 GHz, more preferably 13.56 and 27.12 MHz. The electrical power used to create such a high-frequency electrical field in the processes of the present invention preferably is in the range of from 10 to 10.000 kWh, more preferably of from 100 to 5.000 kWh, most preferably of from 500 to 2.000 kWh.

Said reacted binder composition may still comprise unreacted polymer(s) A1, optionally unreacted component A2, optionally unreacted 1,3-dihydroxyacetone, optionally unreacted glycolaldehyde, optionally unreacted glyceraldehyde, optionally unreacted component B2 and/or optionally unreacted components C1.

Optionally said reacted binder composition comprises less than 15 wt.-%, preferably less than 10 wt.-%, more preferably less than 8 wt.-% unreacted polymer(s) A1, unreacted component B1, unreacted component A2 and unreacted component B2 in total based on the total weight of the sum of polymer(s) A1, component A2, component B1 and component B2 before reacting the binder composition.

Lignocellulosic Pieces and Composite Articles Therefrom:

Lignocellulosic pieces as used according to the present invention may be produced by cutting, sawing, crushing and/or grinding lignocellulose-containing materials. Cutting, sawing, crushing and/or grinding of the lignocellulosic materials into lignocellulosic pieces can be carried out by methods known in the art (cf. for example M. Dunky, P. Niemz, Holzwerkstoffe and Leime [Wood Materials and Glues], pp. 91 to 156, Springer Verlag Heidelberg, 2002). Suitable lignocellulosic materials may be ordinarily lignocellulose-containing plants and/or plant parts, in particular wood. Examples of suitable plants include trees, grasses, flax, hemp or mixtures thereof, preferably trees. Preferably lignocellulosic pieces are made from wood. Any desired type of coniferous wood and/or hardwood may be suitable for the production of the wood particles, such as industrial wood residues, forest timber and/or plantation timber, preferably eucalyptus, spruce, beech, pine, larch, linden, poplar, ash, oak, fir or mixtures thereof, more preferably eucalyptus, spruce, pine, beech or mixtures thereof.

However, other plants comprising lignin, agricultural and/or forestry raw materials and/or residues comprising lignin, such as e.g. straw, flax straw, and/or cotton stalks, can also be used for preparation of lignocellulosic pieces. Palms and/or grasses with lignified stems, such as bamboo, are also suitable for preparation of lignocellulosic pieces. A further source of lignocellulose-containing material for the preparation of lignocellulosic pieces may be waste wood, such as old furniture. One or a plurality of lignocellulosic materials can be used for the production of lignocellulosic pieces.

There are no restrictions on the average density of the lignocellulosic materials from which the lignocellulosic pieces are produced, and this density may be 0.2 to 0.9 g/cm 3, preferably 0.4 to 0.85 g/cm 3, particularly preferably 0.4 to 0.75 g/cm 3, in particular 0.4 to 0.6 g/cm 3. Here, density refers to the bulk density in a standard atmosphere (20° C./65% humidity) as defined in DIN 1306, i.e. taking into consideration the hollow space contained in the lignocellulose-containing starting material, e.g. the tree trunk.

Lignocellulosic pieces may comprise beams, lamellas, planks, veneers, strips, particles (like strands, chips or fibers), and/or dust. Preferably, the lignocellulose-containing pieces are used in the form of fibers, strands, chips, dust or mixtures thereof, preferably chips, fibers, dust or mixtures thereof, particularly preferably chips, fibers or mixtures thereof, most preferably chips. The lignocellulosic pieces used can comprise foreign matter that does not originate from lignocellulose-containing plants. The content of foreign matter can vary over a broad range, and is ordinarily 0 to 30 wt.-%, preferably 0 to 10 wt.-%, particularly preferably 0 to 5 wt.-%, in particular 0 to 1 wt.-%, based on the oven dry weight of the lignocellulosic pieces. Foreign matter can be plastics, adhesives, coatings and/or dyes, etc. contained for example in waste wood.

The oven-dry weight of the lignocellulosic pieces is the weight of the lignocellulosic pieces minus the water present therein and can be determined according to EN 322:1993 by placing the pieces in a drying oven at a temperature of (103±2) °C. until constant mass has been reached.

The lignocellulosic pieces may be totally or partially delignified before using them for the production of the composite articles. Preferably at least 50 wt.-%, more preferably at least 75 wt.-%, more preferably at least 90 wt.-% of the lignin of the lignocellulosic pieces is removed by the delignification step. Delignification may be performed by treatment with an aqueous solution of $H_2O_2$ and acetic acid as described in M. Frey, et al., ACS Appl. Mater. Interfaces, 2018, 20, page 5030 to 5037, or by treatment with an aqueous solution of NaOH and $Na_2SO_3$ as described in M. Zhu, et al., Adv. Mat. 2016, 28 page 5181 to 5187. Preferably, the lignocellulosic pieces are used without a previous delignification step.

According the present invention the lignocellulose-based composite articles may belong to one of the categories solid wood composite (e.g. glulam), veneer composite (e.g. plywood), chip/strand composites (e.g. chipboard, oriented strand board) or fiber composites (e.g. medium density fiber board) as listed in M. Dunky, P. Niemz, Holzwerkstoffe and Leime [Wood Materials and Glues], page 7, Springer Verlag Heidelberg, 2002.

Chip/strands composites and fiber composites are collectively referred to as composites made from particles.

Lignocellulosic Particles and Composite Articles Therefrom

According to this invention the term lignocellulosic particles is used as a generic term for fibers, strands and chips.

The lignocellulosic particles can be dried according to common drying methods known to the person skilled in the art, resulting in the common low residual water content (within a common range of variability; so-called "residual moisture content"). Common drying methods are listed in M. Dunky, P. Niemz, Holzwerkstoffe and Leime [Wood Materials and Glues], page 111 to 118, Springer Verlag Heidelberg, 2002. The moisture content of the particles can be measured according to EN 322:1993 by placing the particles in a drying oven at a temperature of (103±2°) C. until constant mass has been reached. Chips may be dried to a moisture content of 1 to 8%, preferably 1 to 6%, before adding the binder composition.

According to this invention the lignocellulose-based composite articles made from lignocellulosic particles, preferably from wood particles, may be chipboard (also called particle board), oriented strand board (OSB), medium density fiber board (MDF), high density fiberboard (HDF) and/or wood fiber insulation board (WFI). The production methods for these composites and the use of these composites are known to the person skilled in the art and are described for example in M. Dunky, P. Niemz, Holzwerkstoffe and Leime [Wood Materials and Glues], Part 1, Chapters 4 and 5, Springer Verlag Heidelberg, 2002. Preferably the lignocellulose-based composite article is chipboard, MDF, HDF or WFI, more preferably chipboard.

Strands may be used for example for the production of oriented strand board (OSB) boards. The average size of the strands is ordinarily 20 to 300 mm, preferably 25 to 200 mm, particularly preferably 30 to 150 mm.

Chips may be used for the production of chipboards. Chips needed for this purpose can be classified according to size by means of sieve analysis as described in M. Dunky, P. Niemz, Holzwerkstoffe and Leime [Wood Materials and Glues], page 665 and 666, Springer Verlag Heidelberg, 2002. Appropriate sieves are defined in DIN ISO 3310-1: 2017-11. The average size of the chips, as defined in M. Dunky, Holzforschung and Holzverwertung, 1988, 40, pages 126-133, may be 0.01 to 30 mm, preferably 0.05 to 25 mm, particularly preferably 0.1 to 20 mm.

Fibers may be wood fibers, hemp fibers, bamboo fibers, *miscanthus* fibers, bagasse fibers (sugar cane) or mixtures thereof, preferably wood fibers. The length of the fibers may be 0.01 to 20 mm, preferably 0.05 to 15 mm, particularly preferably 0.1 to 10 mm.

Strands may be wood strands, hemp strands, bamboo strands, bagasse strands or mixtures thereof, preferably wood strands. The length of the strands may be 20 to 500 mm, preferably 50 to 200 mm, particularly preferably 100 to 150 mm. The width of the strands may be 1 to 50 mm, preferably 5 to 30 mm, particularly preferably 10 to 15 mm. The thickness of the strands may be 0.2 to 2 mm, preferably 0.4 to 1.2 mm, particularly preferably 0.6 to 0.8 mm. Strands may also be called flakes. Wood wool belongs to the group of wood strands.

The total thickness of the lignocellulose-based composite articles made from lignocellulosic particles according to the present invention varies with the field of use. Lignocellulose-based composite articles made from particles are preferably in the range from 0.5 to 100 mm, preferably in the range from 10 to 40 mm, especially 15 to 20 mm.

The lignocellulose-based composite articles made from lignocellulosic particles according to the present invention may comprise one or several layers. Single-layered or multi-layered composite articles such as for example single-layered or three-layered chipboard are commonly known (M. Dunky, P. Niemz, Holzwerkstoffe and Leime [Wood Materials and Glues], page 18 to 22., Springer Verlag Heidelberg, 2002).

The lignocellulose-based composite article may be a multi-layer, preferably a three-layered chipboard. Optionally the lignocellulose-based composite article consists of a core layer and two surface layers. The lignocellulose-based composite article comprises the reacted binder composition according to the present invention in at least one layer. The lignocellulose-based composite article may comprise the reacted binder composition according to the present invention in more than one layer, wherein binder compositions according to the present invention, which are used in the different layers may be the same or different for the different layers. Preferably, the surface layers comprise the reacted binder composition according to the present invention. The core layer may comprise a reacted binder composition according to the present invention or a reacted binder composition selected from the group consisting of phenol-formaldehyde resins, amino resins, a binder based on organic isocyanate or mixtures thereof, preferably a reacted binder composition according to the present invention.

The multi-layer particle board, preferably a three-layered chipboard, preferably has a formaldehyde emission measured according to EN717-2 lower than 2.0 mg/m² h, preferably lower than 1.5 mg/m² h.

Suitable phenol-formaldehyde resins (also termed PF resins) are known to the person skilled in the art, see by way of example Kunststoff-Handbuch [Plastics Handbook], 2nd edn., Hanser 1988, vol. 10 "Duropiaste" [Thermosets], pp. 12 to 40.

Suitable amino resin can be any of the amino resins known to the person skilled in the art, preferably those for the production of wood-based composites. These resins, and also production thereof, are described by way of example in Ullmanns Enzyklopadie der technischen Chemie [Ullmann's Encyclopedia of Industrial Chemistry], 4th revised and extended edition, Verlag Chemie, 1973, pp. 403-424 "Aminoplaste" [Aminoplastics] and Ullmann's Encyclopedia of Industrial Chemistry, vol. A2, VCH Verlagsgesellschaft, 1985, pp. 115-141 "Amino Resins" and also in M. Dunky, P. Niemz, Holzwerkstoffe and Leime [Wood-based materials and glues], Springer 2002, pp. 251-259 (UF resins) and pp. 303-313 (MUF and UF with small quantity of melamine). These are generally polycondensates of compounds having at least one carbamide group or amino group, optionally to some extent substituted with organic moieties (another term for the carbamide group being carboxamide group), preferably carbamide group, preferably urea or melamine, and of an aldehyde, preferably formaldehyde. Preferred polycondensates are urea-formaldehyde resins (UF resins), urea-formaldehyde resins (MF resins) and melamine-containing urea-formaldehyde resins (MUF resins), with particular preference urea-formaldehyde resins, for example Kau-rite glue products from BASF SE.

Suitable organic isocyanates are organic isocyanates having at least two isocyanate groups and mixtures of these, in particular any of the organic isocyanates known to the person skilled in the art and mixtures of these, preferably those for the production of wood-based materials or of polyurethanes. These organic isocyanates, and also the production thereof, are described for example in Becker/Braun, Kunststoff Handbuch [Plastics handbook], 3rd revised edition, vol. 7 "Polyurethane" [Polyurethanes], Hanser 1993, pp. 17-21, pp. 76-88 and pp. 665-671.

Preferred organic isocyanates are oligomeric isocyanates having from 2 to 10, preferably from 2 to 8, monomer units and on average at least one isocyanate group per monomer unit, and mixtures of these. The isocyanates can be either aliphatic, cycloaliphatic or aromatic. Particular preference is given to the organic isocyanate MDI (methylenediphenyl diisocyanate) and/or the oligomeric organic isocyanate PMDI (polymeric methylenediphenyl diisocyanate), these being obtainable via condensation of formaldehyde with aniline and phosgenation of the isomers and oligomers produced during the condensation (see by way of example Becker/Braun, Kunststoff Handbuch [Plastics handbook], 3rd revised edition, vol. 7 "Polyurethane" [Polyurethanes], Hanser 1993, p. 18, final paragraph to p. 19, second paragraph and p. 76, fifth paragraph), and mixtures of MDI and/or PMDI. Very particular preference is given to products in the LUPRANATE® range from BASF SE, in particular LUPRANATE® M 20 FB from BASF SE.

The organic isocyanate may be also an isocyanate-terminated prepolymer which is the reaction product of an isocyanate, e.g. PMDI, with one or more polyols and/or polyamines. The composite articles of the invention made from particles may have a mean overall density of 100 to 1000 kg/m$^3$, preferably 400 to 850 kg/m$^3$. The chipboards of the invention may have a mean overall density of 400 to 750 kg/m$^3$, more preferably 425 to 650 kg/m$^3$, especially 450 to 600 kg/m$^3$. The density is determined 24 hours after production according to EN 323:1993.

Optionally 3 to 15 wt.-%, more preferably 3.5 to 12 wt.-%, more preferably 4 to 10 wt.-%, most preferably 4.5 to 8 wt.-%, most preferably 4.5 to 6 wt.-% polymer(s) A1 and component B1 in total based on the total oven-dry weight of the lignocellulosic pieces, preferably particles, are used for the preparation of the lignocellulose-based composite article.

Optionally the minimum amount of A1 based on the total oven-dry weight of the lignocellulosic pieces, preferably particles, is 1.5 wt.-%, preferably 2 wt.-%, preferably 2.5 wt. %, preferably 3 wt.-%.

Preferably the lignocellulosic pieces are fibers or chips, more preferably chips.

Optionally 3 to 10 wt.-%, preferably 3.5 to 9 wt.-%, more preferably 4 to 8 wt.-%, most preferably 4.5 to 7 wt.-%, polymer(s) A1 and component B1 in total based on the total oven-dry weight of the lignocellulosic chips, preferably wood chips, are used for the preparation of composite articles, preferably chip boards.

Optionally 5 to 15 wt.-%, preferably 5.5 to 12 wt.-%, more preferably 6 to 10 wt.-%, polymer(s) A1 and component B1 in total based on the total oven-dry weight of the lignocellulosic fibers, preferably wood fibers, are used for the preparation of composite articles, preferably fiber boards like medium density fiber board (MDF), high density fiberboard (HDF) or wood fiber insulation board (WFI), preferably MDF.

A further aspect of the present invention relates to a process for the batchwise or continuous production of lignocellulose-based composite articles, in particular single-layered lignocellulose-based boards or multi-layered lignocellulose-based boards, with a core and with at least one upper and one lower surface layer, comprising the following steps.
  a) mixing of the lignocellulosic particles with a binder composition for each layer, wherein the mixture for at least one layer comprises the binder composition according to the present invention,
  b) layer-by-layer scattering of the mixtures for the individual layers to form a mat,
  c) pressing the mat to a board at a temperature of 80 to 300° C., preferably 120 to 280° C., more preferably 150 to 250° C. and at a pressure of 1 to 100 bar, preferably 1 to 50 bar, preferably 1 to 25 bar, wherein the lignocellulosic particles are preferably chips and/or fibers.

The temperature given for step c) refers to the surface temperature of the heated surface used for pressing, in particular the surface temperature of the press-plates.

At the end of the pressing in step c) the temperature in the center of the pressed mat may be at least 80° C., preferably between 80 and 180° C., preferably between 90 and 150° C., more preferably 95 to 125° C. The boards can be cooled down in a star cooler or more slowly by hot stacking.

A further aspect of the present invention relates to a method for the batchwise or continuous production of lignocellulose-based composite articles, in particular single-layered lignocellulose-based boards or multi-layered lignocellulose-based boards with a core and with at least one upper and one lower surface layer, comprising the following steps.
  a) mixing of the lignocellulosic particles with a binder composition for each layer, wherein the mixture for at least one layer comprises the binder composition according to the present invention,
  b) layer-by-layer scattering of the mixtures for the individual layers to form a mat,
  c) pressing the mat to a board at a temperature of 80 to 200° C., preferably 80 to 180° C., more preferably 90 to 150° C. and most preferably 100 to 150° C. and at a pressure of 0.1 to 100 bar, preferably 0.1 to 50 bar, preferably 0.1 to 25 bar, wherein a high-frequency electrical field is applied during pressing and wherein the lignocellulosic particles are preferably chips or fibers.

The temperature given for step c) refers to the temperature in the center of the pressed mat at the end of step c'). The boards can be cooled down in a star cooler or more slowly by hot stacking.

The measurement of the temperature in the center of the pressed mat may be carried out according to known methods, in particular according to Meyer/Thoemen, Holz als Roh-und Werkstoff [European Journal of Wood and Wood Products] (2007) 65, page 49 to 55 or Thoemen, 2010, "Vom Holz zum Werkstoff—grundlegende Untersuchungen zur Herstellung and Struktur von Holzwerkstoffen [From wood to materials—basic investigations for the preparation and the structure of wood-based materials]", ISBN 978-3-9523198-9-5, page 24 to 30 and page 78 to 85. For the wireless measurement of the temperature sensors such as the CONTI LOG- or EASYlog-sensors of the Fagus-Grecon Greten GmbH& Co. KG can be used, which can be inserted in the mat during the scattering of the mat.

The time from the start to the end of pressing in step c) is the press time. The press time factor is the press time divided by the target thickness of the board as described in the example section ("Measured values and measuring methods"). Optionally in the process according to the present invention the press time factor is at most 20 s/mm, preferably at most 14 s/mm, preferably at most 12 s/mm, preferably at most 10 s/mm, preferably at most 8 s/mm and optionally in the process according to the present invention the press time factor is at least 2 s/mm, preferably at least 3 s/mm, preferably at least 4 s/mm, preferably at least 5 s/mm.

Components A and B of the binder composition may be added separately or as a mixture as defined below. Optionally component C may be added as a mixture with components A and/or B or separately.

For the batchwise or continuous production of lignocellulosic composite articles which are multi-layered lignocellulose-based boards with a core and with at least one upper and one lower surface layer, the surface layer may comprise a binder composition according to the present invention and the core layer may comprise a binder selected form the group consisting of urea/formaldehyde binder, phenol/formaldehyde binder, melamine/urea/formaldehyde binder, PMDI binder and mixtures thereof.

The corresponding methods for producing lignocellulose-based composites, in particular single-layered lignocellulose-based boards or multi-layered lignocellulose-based boards with at least a core and two surface layers, comprising the steps a), b) and c) are generally known to the person skilled in the art, and are described for example in M. Dunky, P. Niemz, Holzwerkstoffe and Leime [Wood Materials and Glues], Part 1, Chapter 4, Springer Verlag Heidelberg, 2002 or in A. Wagenfuhr, F. Scholz, Taschenbuch der Holztechnik [Handbook of Wood Technology], Chapter 2, Fachbuchverlag Leipzig im Carl Hanser Verlag, 2012 or H. Thoemen, M. Irle, M. Sernek (ed.), Wood-Based Panels—An Introduction for Specialists, Chapter 1, COST Office, Brunel University Press, London, UB8 3PH, England. The method according to the invention can be carried out discontinuously or continuously, and preferably continuously.

The mixture(s) obtained by step a) comprise(s) water. The water can derive from the residual moisture comprised in the lignocellulosic particles and from the components A and B and optional C. The water content of these mixture(s) may be adapted using lignocellulosic particles with an appropriate moisture and/or by increasing the water content in component A, B and/or C and/or by adding additional water to the mixture (which is not part of the components A, B and/or C) during step a), for instance by spraying.

The water content of the mixtures obtained by a) is determined in an analogous manner to the determination of the water content of wood-based panels by EN 322:1993. For this, a sample of the respective mixture (ca. 20 g) is weighed in moist condition ($m_1$) and after drying ($m_0$). The mass $m_0$ is determined by drying at 103° C. to constant mass. Water content is calculated as follows: water content [in wt.-%]=[($m_1-m_0$)/$m_0$]*100.

Water content is calculated as follows: water content [in wt.-%]=[($m_1-m_0$)/$m_0$]*100.

In the mixture obtained in step a), the water content of the mixture(s) may be from 3 to 20 wt.-%, preferably from 3.5 to 16 wt.-%, particularly preferably from 4 to 14 wt.-%, very particularly preferably from 5 to 13 wt.-% by weight, based on the total dry weight of the mixture.

If the lignocellulose-based composite is a multi-layered, preferably a three-layered chipboard, the water content in the mixture obtained in step a) for the surface layers is preferably greater than the water content in the mixtures for the core layer obtained in step a).

Optionally the water content [in wt.-%] in the mixture(s) obtained in step a) for the surface layers is greater than the water content [in wt.-%] in the mixture(s) obtained in step a) for the core layer. In particular, the water content [in wt.-%] in the mixture(s) obtained in step a) for the surface layers is greater than the water content [in wt.-%] in the mixture(s) obtained in step a) for the core layer is 0.5 to 6 wt.-% by weight, very particularly preferably from 2 to 5 wt.-% higher.

Optionally the water content of the mixture obtained in step a) for the core layer is from 3 to 15 wt.-%, more preferably from 3.5 to 12 wt.-%, particularly preferably from 4 to 10 wt.-%, very particularly preferably from 5 to 9 wt.-%, based on the total dry weight of the mixture and the water content of the mixture(s) obtained in step a) for the surface layers is from 5 to 20 wt.-%, preferably from 6 to 16 wt.-%, particularly preferably from 7 to 14 wt.-%, very particularly preferably from 8 to 13 wt.-%, based on the total dry weight of the mixture(s).

After step b) and before step c) or c) the layer(s) may be pre-compressed at a pressure of 0.1 to 30 bar, preferably 0.1 to 25 bar, more preferably 1 to 20 bar, more preferably 1 to 15 bar. The pre-compressing step may take from 1 sec to 120 sec, preferably from 2 to 60 sec, more preferably from 3 to 30 sec. Usually, the pre-compressing step is done without applying heat to the scattered mat. After the pre-compressing step and prior to process step c) or c'), energy can be introduced into the mat in a preheating step with one or more energy sources of any kind. Suitable energy sources are for example hot air, steam or steam/air mixtures. This increases the temperature of the mat and may change the moisture of the mat. After the optional preheating step, the temperature in the core of the mat may be between 40 to 80° C., preferably between 40 and 70° C. The preheating with steam and steam/air mixtures can also be conducted in such a way that only the surface-near areas are heated, but the core is not.

Optionally the water content in the lignocellulosic composite obtained in step c) or c) is from 3 to 20 wt. % by weight, preferably from 5 to 15 wt.-%, more preferably from 7 to 13 wt.-% measured according to EN 322:1993.

From the beginning of scattering until the beginning of precompression, there can for example be an interval of 1 to 120 sec, preferably 2 to 60 sec, particularly preferably 3 to 20 sec. From the beginning of scattering until the beginning of heating and/or pressing, there can for example be an interval of 5 to 300 sec, preferably 7 to 120 sec, particularly preferably 10 to 60 sec.

Precompression and preheating can be carried out by a method known to the person skilled in the art, such as those described in M. Dunky, P. Niemz, Holzwerkstoffe and Leime [Wood Materials and Glues], Springer Verlag Heidelberg, 2002, pg. 122 and 819 or in H.-J. Deppe, K. Ernst, MDF-Medium-Density Fiberboard, DRW-Verlag, 1996, pp. 44, 45 and 93 or in A. Wagenfuhr, F. Scholz, Taschenbuch der Holztechnik [Handbook of Wood Technology], Fachbuchverlag Leipzig, 2012, pg. 219.

In step c) or c'), the thickness of the mat is (further) reduced. In addition, the temperature of the mat is increased by inputting energy. In the simplest case, a constant pressing force is applied, and the mat is simultaneously heated by means of a constant-power energy source. However, both the inputting of energy and compression by means of a pressing force can take place at respectively different times and in a plurality of stages. The inputting of energy in process step c) can be carried out by heat transfer from heated surfaces, for example press plates, to the mat. The inputting of energy in method step c) can be carried out by high-frequency heating (by applying a high-frequency electrical field) or by a combination of high-frequency heating and heat transfer from heated surfaces.

This pressing can be carried out by any methods known to the person skilled in the art (cf. examples in "Taschenbuch der Spanplatten Technik [Handbook of Particle Board Technology," H.-J. Deppe, K. Ernst, 4th edition, 2000, DRW-Verlag Weinbrenner, Leinfelden Echterdingen, pp. 232 to 254, and "MDF—Mitteldichte Faserplatten [Medium-Density Fiberboards]" H.-J. Deppe, K. Ernst, 1996, DRW-Verlag Weinbrenner, Leinfelden Echterdingen, pp. 93 to 104). Optionally continuous pressing methods, for example using double band presses, are used.

When step c) involves a combination of high-frequency heating and heat transfer from heated surfaces or plates the heated press surfaces or plates preferably have temperatures from in the range of from 80 to 200° C., more preferably from 90 to 180° C., most preferably from 100 to 150° C.

Preferred is a process of the present invention, wherein in said step c) of applying a high-frequency electrical field the temperature at the center of the pressed mat is increased to a maximum temperature in the range of from 80° C. to 200° C., preferably in the range of from 80° C. to 180° C., wherein preferably the maximum temperature is reached in less than 40 s (d/mm) after the start of applying a high-frequency electrical field, where d is the thickness of the compacted mixture in mm at the end of step c'), more preferably in less than 30 s (d/mm), even more preferably in less than 20 s (d/mm), most preferably in less than 15 s·(d/mm) after the start of applying a high-frequency electrical field, where d is the thickness of the pressed mat in mm at the end of step c'). E.g., if the thickness d of the compacted mixture in mm at the end of step c) is 10 mm, the maximum temperature is preferably reached in less than 400 s, more preferably in less than 300 s, even more preferably in less than 200 s, most preferably in less than 150 s after the start of applying a high-frequency electrical field.

The term "center of the pressed mat" as used in this text designates the location which is approximately in the middle between the surfaces of the three-dimensional object defined by the pressed mat in step c) or c').

Component A and component B can be added to the lignocellulosic pieces, in particular particles, in step a) either a1) separately from one another or a2) as a mixture, preferably separately from one another.

An addition of components A and B separately from one another is understood here to mean that component A and component B are added to the lignocellulosic particles in step a) with the aid of separate application devices, for example nozzles or applicator disks. The application devices may be arranged spatially in such a way or in such a time sequence that the addition of component A and component B is effected successively, in any sequence, or simultaneously. Optionally the application devices are arranged such that component A and component B are added simultaneously but not as a mixture to the lignocellulosic particles. In general, this is achieved by virtue of the application devices being in immediate spatial proximity, e.g. the distance between the application devices may be between 1 cm and 300 cm, preferably between 5 cm and 200 cm, more preferably between 10 cm and 100 cm. Optionally the application devices may also be aligned here such that the components mix partly or completely even when they are on the way from the application devices to the lignocellulosic particles.

If the optional component C is used in step a), addition of component A and component B as a mixture may mean that a) components A and B are added as a mixture and component C is added separately, or b) components A and B and C are added as a mixture.

If the optional component C is used in step a), addition of component A and component B separate from one another may mean that a) components A and C are added as a mixture and component B is added separately, or b) components B and C are added as a mixture and component A is added separately, or c) all components A and B and C are added separately.

When components A, optionally premixed with component C, and component B, optionally premixed with component C are added as a mixture, the resulting mixture is added to the lignocellulosic particles after a waiting time of less than 120 min, preferably 90 min or less than 90 min, preferably 60 or less than 60 min, preferably 40 or less than 40 min, preferably 20 or less than 20 min, more preferably 10 or less than 10 min, 5 or most preferably less than 5 min, 1 or less than 1 min. Waiting time is the time period between the mixing and the addition to the lignocellulosic particle and may be at least 30 sec. During the waiting time the mixture of might be exposed to a temperature of preferably 10 to 50° C., preferably 15 to 40° C., preferably 20 to 30° C., preferably 10 to 25° C.

Preferably, Components A and B do not react before mixing the lignocellulosic particles with the binder composition.

A further aspect of the present invention relates to the use of the lignocellulosic articles made from particles.

In a further preferred use, the lignocellulose-based composite articles are coated on one or more sides, for example, with melamine films, with veneers, with a plastic edge or with paint.

Optionally the lignocellulose-based composite articles, for example the chipboard or the fiberboard are used as inner plies for sandwich materials. In this case, the outer plies of the sandwich materials may consist of different materials, for example of metal such as aluminum or stainless steel, or of thin wood-based chipboards or fiberboards, preferably high-density fiberboards (HDF), or of laminates, for example high-pressure laminate (HPL).

Examples of uses of the lignocellulose-based composite article or of the coated lignocellulose-based composites produced therefrom or of the sandwich materials produced therefrom are as material for furniture, for example as material for cabinet side, as shelf in cabinets, as material for bookshelves, as furniture door material, as countertop, as kitchen unit front, as elements in tables, chairs and/or upholstered furniture. Examples of uses of the lignocellulose-based composite article or of the coated lignocellulose-based composites produced therefrom or of the sandwich materials produced therefrom are as building and/or construction material, for example as material for interior fit-out, shopfitting and exhibition stand construction, as material for roof and/or wall paneling, as infill, cladding, floors and/or inner layers of doors, and/or as separating walls.

Beams, Lamellas, Blanks and/or Veneers and Composite Articles Therefrom

If the lignocellulose-based composite article is made from beams, lamellas, blanks and/or veneers the weight of binder composition in wt.-% based on the total composite strongly depends on the size of the lignocellulosic beams, lamellas, blanks and/or veneers. Therefore, in such kind of composites the weight of binder composition is usually calculated in mass of binder composition per surface area of the piece to be glued.

Suitable amounts are 5 to 200 g/m$^2$ polymer(s) A1 and component B1 in total. In the context of these composites the terms glue or adhesive are often used in the prior art instead of binder composition. In the description of the present invention the term binder composition is used for all kind of lignocellulose-based composites articles.

Lignocellulose-based composite articles made from beams, lamellas, blanks and/or veneers may be glulam, plywood, cross laminated timber, solid wood board and/or blockboard.

Alternatively, the composite article made from veneers is a chipboard or fiberboard covered by one or more veneers at least on one side of the board.

A further aspect of the present invention relates to a process for the batchwise or continuous production lignocellulose-based composites, which may be glulam, plywood, cross laminated timber, blockboards or solid wood boards, preferably plywood, comprising the following steps,
 a) applying the binder composition onto at least one surface of one or more lignocellulosic pieces,
 b) joining the one or more lignocellulosic pieces having the binder composition thereon with one or more lignocellulosic pieces, and
 c) pressing the lignocellulosic pieces together, wherein the lignocellulosic pieces are beams, lamellas, blanks and/or veneers.

Pressing in step c) may be at a temperature of 20 to 200° C., preferably 15 to 150° C., more preferably 10 to 110° C. and at a pressure of 1 to 100 bar, preferably 1 to 50 bar, more preferably 1 to 25 bar, wherein the temperature is the maximum temperature reached in the binder composition during step c)

The corresponding methods for producing composites made from beams, lamellas, blanks and/or veneers comprising the steps a), b) and c) are generally known to the person skilled in the art, and are described for example in M. Dunky, P. Niemz, Holzwerkstoffe and Leime [Wood Materials and Glues], pp 93 to 102, Springer Verlag Heidelberg, 2002.

A further aspect of the present invention relates to a process for the batchwise or continuous production of plywood, comprising the following steps
 a) applying the binder composition onto at least one surface of one or more pieces of veneers
 b) joining the wood pieces obtained in step a), and
 c) pressing the wood pieces together.

Plywood is composed of at least three plies of wood veneers glued on top of each other, wherein the directions of fiber of adjacent plies are arranged in angle of about 90° C. In the case of three-ply plywood, the back veneer run through a glue spreader, which applies the glue to the upper surface of the back veneer. The core veneer or several veneer stripes placed one beside the other are laid on top of the glued back veneer, and the whole sheet is run through the glue spreader a second time. Thereafter, the face veneer is laid on the top glued core. This glued sheet or several of these glued sheets stacked on top of each other are loaded into a press, for example a multi-opening hot press. The sheets may be pressed at 80 to 170° C. and at a pressure of 5 to 15 bar. Multi-ply plywood, e.g. five-ply of seven-ply plywood, are produced in a similar manner, just with more than one core veneer layers.

The production of blockboards is similar to the process of a three-ply plywood. Instead of the core veneers a sheet is used which is made from several wood blanks glued together.

A further aspect of the present invention relates to the use of the lignocellulosic articles made from beams, lamellas, blanks and/or veneers:

Examples of uses are as material for furniture, for example as construction material for cabinets, as shelves, as furniture door material, as countertop, as kitchen unit front, and/or as elements in tables, Examples of uses are as building and construction material, for example as material for interior fitout, shopfitting and/or exhibition stand construction, as material for roof and/or wall paneling, as infill, cladding, floors and/or inner layers of doors, and/or as separating walls, as material for car ports and/or for hall roofs.

Materials

Glyceraldehyde (>90%), Sigma Aldrich
Glycolaldehyde dimer (>90%), Sigma Aldrich
1,3-Dihydroxyacetone (DHA), Sigma Aldrich
Glucose monohydrate, Sigma Aldrich, Spain
Fructose, Sigma Aldrich, USA
Hexamethylene diamine (HMDA), Acros Organic
L-Lysine (98%), Sigma Aldrich, Switzerland
L-Lysine solution (50% in water), ADM animal nutrition, USA
Lupasol G100 (50% aqueous solution of polyethyleneimine), BASF SE
1,2-Ethylenediamine (99%), Sigma Aldrich
N-(2-Aminoethyl)-1,3-propylenediamine (97%), Sigma Aldrich
NIN-Bis-(3-aminopropyl)-1,2-ethylenediamine (94%), Sigma Aldrich
Ethylene imine, BASF SE
Adipic acid (99%), Sigma Aldrich
Oleyl alcohol (technical grade, 85%), Sigma Aldrich, Belgium
Stearic acid (>97%), Sigma Aldrich, Germany
Pyridine (>99.5%), Sigma-Aldrich
Hydroxylamine hydrochloride (99%), Sigma-Aldrich
1,4-butanediol (>99%), TCI
Benzanilide (98%), Sigma Aldrich
Diisobutyl carbinol (80%), Sigma-Aldrich
Formaldehyde, 37% in water, Bernd Kraft
N-methyl-N-(trimethylsilyl)trifluoroacetamide (>98.5%), Sigma Aldrich
25 wt. % solution of sodium methoxide in methanol, Sigma Aldrich
Triethyl amine (>99%), Sigma-Aldrich
Phenyl hydrazine (97%), Sigma-Aldrich
2-Ethyl-1-hexanol (>99.0%), Sigma-Aldrich
Tetrahydrofuran (THF), anhydrous (>99%), Sigma-Aldrich
Thionyl chloride (97%), Sigma-Aldrich Toluene (>99.5%), Sigma-Aldrich
Acetic acid (2% in water), Ricca Chemical
Ammonium chloride (>99.5%), Sigma-Aldrich
Ammoniumsulfate (>99%), Bernd Kraft
Methanol (99.8%), anhydrous, Sigma-Aldrich
Triethyl orthoformate (98%) anhydrous, Sigma-Aldrich
Carboxymethylcellulose sodium salt ($M_w$ ca 250.000), Sigma-Aldrich, US
HydroWax 138 (60% paraffin in water), Sasol Wax GmbH
Kaurit Glue 350 (solid content 65%), BASF SE
Spruce wood chips and fibers from Germany, Institut für Holztechnologie Dresden Spruce Wood Chips The chips were produced in a disc chipper. Spruce trunk sections (length 250 mm) from Germany were pressed with the long side against a rotating steel disc, into which radially and evenly distributed knife boxes are inserted, each of which consists of a radially arranged cutting knife and several scoring knives positioned at right angles to it. The cutting knife separates the chip from the round wood and the scoring knives simultaneously limit the chip length. Afterwards the produced chips are collected in a bunker and from there they are transported to a cross beater mill (with sieve insert) for re-shredding with regard to chip width. Afterwards the reshredded chips were conveyed to a flash drier and dried at approx. 120° C. The chips were then screened into two useful fractions (B: ≤2.0 mm×2.0 mm and >0.32 mm×0.5 mm; C: ≤4.0 mm×4.0 mm and >2.0 mm×2.0 mm), a coarse fraction (D: >4.0 mm×4.0 mm), which is reshreded, and a fine fraction (A: ≤0.32 mm×0.5 mm).

Fraction B is used as surface layer chips for three-layered chipboards ("surface layer chips") A mixture of 60 wt.-% of fraction B and 40 wt.-% of fraction C is used either as core layer chips for three-layered chipboards and as chips for single-layered chipboards ("core layer chips")

Spruce Wood Fibers

The pulp was produced in a laboratory refining plant. An integrated steep conveyor transported the chips made from German spruce into the plant's preheater. Directly from the preheater, a continuously operating plug screw with integrated dewatering (MSD-Multi Screw Device) conveyed the material to be defibered into the pressure area of the plant. The material to be defibered was then plasticized in the digester at a digestion pressure of 9 bar under constant movement (3-4 min dwell time) and continuously conveyed to the refiner via a discharge screw and defibered. From the refiner, the fibers came via the tangential outlet and the blowline to the flash tube dryer and were dried.

Methods:

Measured Values and Measuring Methods

Residual particle moisture content:

The moisture content of the particles (chips or fibers) before application of the binder (was measured according to EN 322:1993 by placing the particles in a drying oven at a temperature of (103±2) ° C. until constant mass has been reached.

The water content of the particle/binder composition mixtures obtained in step a) is determined in an analogous manner. For this, a sample of the respective mixture (ca. 20 g) is weighed in moist condition ($m_1$) and after drying ($m_0$). The mass $m_0$ is determined by drying at 103° C. to constant mass. Water content is calculated as follows: water content [in wt.-%]=$[(m_1-m_0)/m_0]*100$.

Press Time Factor:

The press time factor is the press time, which is the time from closing to opening of the press, divided by the target thickness of the board. The target thickness refers to the board at the end of pressing step c) or c') and is adjusted by the press conditions, i.e. by the distance between the top and bottom press plate, which is adjusted by inserting two steel spacing strips in the press.

Press time factor [sec/mm]=time from closing to opening of the press [sec]: target thickness of the pressed board [mm]. For example, when a 10 mm chipboard is made with a press time of 120 sec, a press time factor of 12 sec/mm results.

Density of the Boards:

The density of the boards was measured according to EN 323:1993 and is reported as the arithmetic average of ten 50×50 mm samples of the same board.

Transverse tensile strength of the boards ("internal bond"):

Transverse tensile strength of the boards ("internal bond") was determined according to EN 319:1993 and is reported as the arithmetic average of ten 50×50 mm samples of the same board.

Swelling in Thickness:

Swelling in thickness after 24 h of the boards ("24 h swelling") was determined according to EN 317:1993 and is reported as the arithmetic average of ten 50×50 mm samples of the same board.

Formaldehyde Emission

Formaldehyde emission was determined according to EN 717-2 and is given in [mg (HCHO)/m$^2$ h]

Binder Amount:

The binder amounts in the examples according to the present invention are reported as the total weight of the sum of the respective binder components polymer(s) A1 and component B1 and optionally component B2 in wt.-% based on the total dry weight of the wood particles (chips or fibers).

The binder amounts in the comparative examples are reported as the total weight of the sum of all binder components in wt.-% (dry weight, which is the weight of the components without any water) based on the total dry weight of the wood particles (chips or fibers).

Ratio of Polymer(s) A1 and Component B1 (Ratio A1:B1):

The ratio of polymer(s) A1 and component B1 refers to the weight ratio of polymer(s) A1 and component B1.

Primary and Secondary Amine Group Amine Group Nitrogen Content $NC_{ps}$:

The $NC_{ps}$ are measured by potentiometric titration according to EN ISO 9702:1998. The $NC_{ps}$ mean the weight of nitrogen of the primary and secondary amine groups per 100 g of polymer(s) A1 (given in wt. %).

Determination of the Weight-Average Molecular Weight $M_w$:

$M_w$ was determined by size exclusion chromatography under the following conditions:

Solvent and eluent: 0.1% (w/w) trifluoroacetate, 0.1 M NaCl in distilled water
Flow: 0.8 ml/min
Injection volume: 100 µl
Samples are filtrated with a Sartorius Minisart RC 25 (0.2 µM) filter
Column material: hydroxylated polymethacrylate (TSK-gel G3000PWXL)
Column size: inside diameter 7.8 mm, length 30 cm
Column temperature: 35° C.
Detector: DRI Agilent 1100 UV GAT-LCD 503 [232 nm]
Calibration with poly(2-vinylpyridine) standards in the molar mass range from 620 to 2890000 g/mole (from PSS, Mainz, Germany) and pyridine (79 g/mol)
The upper integration limit was set to 29.01 mL The calculation of $M_w$ includes the lysine oligomers and polymers as well as the monomer lysine.

The residual lysine monomer content of the polylysine solution was determined by HPLC/MS analysis under the following conditions:
Injection volume: 10 μl
Eluent A: water+0.02% formic acid
Eluent B: water
Gradient

| time [min] | Eluent A [%] | Eluent B [%] |
|---|---|---|
| 0 | 0 | 100 |
| 10 | 100 | 0 |
| 15 | 100 | 0 |
| 15.1 | 0 | 100 |
| 25 | 0 | 100 |

Switching from Eluent A to Eluent B after 15 min
Flow: 0.8 ml/min
Column HPLC: Primesep C, 250×3.2 mm, 5 μm
Column temperature: 30° C.
Calibration with solution of L-lysine in water
Mass spectrometer: Bruker Maxis (q-TOF)
MS conditions:
  Ionization mode: ESI, negative
  Capillary: 3500 V
  Nebulizer: 1.4 bar
  Dry gas: 8 l/min
  Temperature: 200° C.
  analyzed ion: 145.0983 $[M-H]^-\pm 0.005$ amu.

The residual lysine monomer content in Polymer A1 is given as wt.-% monomer based on the total weight of polylysine including the lysine monomer. For instance, the 50 wt.-% solution of Polylysine-5 with a lysine monomer content of 2.0 wt.-% contains 1 wt. % lysine monomer and 49% wt.-% lysine polymer comprising at least 2 condensed lysine units.

Determination of Ratio of ε-Linkagess to α-Linkages in Polylysine ("Ratio ε/α"):

This ratio 6/a can be determined by integration of the signals for —CH—NH$_2$ and —CH—NH (α-linked) and —CH$_2$—NH$_2$ and —CH$_2$—NH (ε-linked) in the $^1$H-NMR spectra of the polylysines. The NMR signals are assigned by an $^1$H, 15 N-HMBC experiment (Heteronuclear Multiple Bond Correlation).

Karl-Fischer Titration:

The water content in the samples FM-1 to FM-4 was determined by Karl-Fischer titration according to ISO 760-1978 using the direct electrometric titration.

Gas Chromatography:

The composition of the samples FM-1 to FM-4 was determined by gas chromatography (GC). A part of the aqueous products was evaporated to dryness. The resulting syrupy product mixture was oximized with hydroxylamine hydrochloride. Therefore, the sample was mixed with the oximation reagent (14 g hydroxylamine hydrochloride dissolved in 200 g pyridine, followed by the addition of 1 g 1,4-butanediol) and stirred for 1 h at 70° C. After cooling down to ambient temperature, the mixture (0.5 mL) was reacted with N-methyl-N-(trimethylsilyl)trifluoroacetamide (1.5 mL).

The product mixtures were analyzed using GC techniques (Agilent 6890 gas chromatograph equipped with a FID (Flame Ionization Detector) detector; column DB1701 60 m×0.32 mm×0.25 μm; temperature program 60° C.–300° C., 5 K/min, injector temperature: 180° C., detector temperature: 300° C., const. gas flow 2.4 ml/min. Injection volume 0.1 μL). The amounts of glycolaldehyde, glyceraldehyde and 1,3-hydroxyacetone were determined by integration of the corresponding signals and comparison with the signals of 1,4-butanediol, which was used as internal standard.

Monitoring of the Temperature During Pressing in the HF Press:

A fiber-optic sensor was used in combination with a temperature measuring instrument suitable for measurements in an environment with strong electromagnetic radiation. The instrument is integrated into the control system of the HF press (HLOP 170 press from Hoefer Presstechnik GmbH). The sensor of the device is a Teflon-coated glass fiber with a gallium arsenide chip (GaAs chip).

Abbreviations

GA=Glycolaldehyde
GA-D=Glycolaldehyde dimer
GLA=Glyceraldehyde
DHA=1,3-Dihydroxyacetone
PL=Polylysine
NaCMC=Carboxymethylcellulose sodium salt

EXAMPLES

Example 1

Synthesis of Polylysines 1-6 and 11

2200 g of L-lysine solution (50% in water, ADM) was heated under stirring in an oil bath (external temperature 140° C.). Water was distilled off and the oil bath temperature was increased by 10° C. per hour until a temperature of 180° C. is reached. The reaction mixture was stirred for an additional hour at 180° C. (oil bath temperature) and then pressure was slowly reduced to 200 mbar. After reaching the target pressure, distillation was continued for another period of time t (as specified in the following Table 1). The product was hotly poured out of the reaction vessel, crushed after cooling and dissolved in water to give a 50 wt. % solution.

Residual lysine monomer content, $NC_{ps}$ and $M_w$ were determined from this solution without any further purification. The residual lysine monomer is included in the calculation of $M_w$

TABLE 1

| Polylysine | t [min] | $M_w$ [g/mol] | $NC_{ps}$ [wt.-%] | L-Lysine monomer content [wt.-%]* | ratio ε/α |
|---|---|---|---|---|---|
| Polylysine-1 | 90 | 1510 | 11.0 | 10.3 | 1.9 |
| Polylysine-2 | 120 | 2010 | 10.5 | 5.9 | 2.1 |
| Polylysine-3 | 150 | 2240 | 10.2 | 4.2 | 2.2 |
| Polylysine-4 | 180 | 2740 | 9.80 | 2.5 | 2.3 |
| Polylysine-5 | 210 | 3360 | 9.50 | 2.0 | 2.3 |
| Polylysine-6 | 240 | 3690 | 9.15 | 1.3 | 2.2 |
| Polylysine-11 | 325 | 11080 | 5.56 | 0.3 | 2.3 |

*The residual lysine monomer content is given as wt.-% based on the total weight of polylysine including lysine monomer.

Example 2

Synthesis of Polylysine-7 (Derivative)

2200 g of L-Lysine solution (50% in water, ADM) was heated under stirring in an oil bath (external temperature 140° C.). Water was distilled off and the oil bath temperature was increased by 10° C. per hour until a temperature of 180° C. is reached. The reaction mixture was stirred for an additional hour at 180° C. (oil bath temperature) and then pressure was slowly reduced to 200 mbar. After reaching the target pressure, distillation was continued for further two hours. The apparatus was ventilated, and 11.0 g of stearic acid was slowly added. The mixture was stirred for 15 min at 180° C. (oil bath temperature). The product was hotly poured out of the reaction vessel, crushed after cooling and dissolved in water to give a 50 wt.-% solution.

$M_w$ and $NC_{ps}$ were measured analogous to Example 1 and are reported in Table 5 a and b.

Example 3

Synthesis of Polylysine-8 (Derivative)

2200 g of L-Lysine solution (50% in water, ADM) was heated under stirring in an oil bath (external temperature 140° C.). Water was distilled off and the oil bath temperature was increased by 10° C. per hour until a temperature of 180° C. is reached. The reaction mixture was stirred for an additional hour at 180° C. (oil bath temperature) and then pressure was slowly reduced to 200 mbar. After reaching the target pressure, distillation was continued for further two hours. The apparatus was ventilated, and 11.0 g of oleyl alcohol was slowly added. The mixture was stirred for 15 min at 180° C. (oil bath temperature). The product was hotly poured out of the reaction vessel, crushed after cooling and dissolved in water to give a 50 wt.-% solution.

$M_w$ and $NC_{ps}$ were measured analogous to Example 1 and are reported in Table 5 a and b.

Example 4

Synthesis of Polyamide-9

85.0 g of 1,2-ethylenediamine, 365 g of N-(2-aminoethyl)-1,3-propylenediamine and 500 g of N,N'-Bis-(3-aminopropyl)-1,2-ethylenediamine were mixed at room temperature and heated to 80° C. 1040 g of adipic acid was added under nitrogen atmosphere. The reaction mixture was stirred under nitrogen atmosphere for 30 min at 80° C. Temperature was increased to 190° C. within 60 min and was kept at 190° C. for 3 h, while water was distilled off. After cooling, water was added to give a 65 wt.-% solution.

$M_w$ and $NC_{ps}$ were measured analogous to Example 1 and are reported in Table 5 a and b.

Example 5

Synthesis of Polyamide-10

514 g of a 65 wt.-% solution of Polyamide-9 in water, 268 g water and 5.75 g sulfuric acid were mixed and heated to 90° C. Under nitrogen atmosphere a cooled solution (0° C.) of 338 g ethylene imine in 225 water was slowly added to this mixture within 2 h. Subsequently, the reaction mixture was stirred for 4 h at 90° C. until there is no ethylene imine monomer detectable by the Preussmann test (spectrophotometric determination after reaction with 4-(4-nitro-benzyl)-pyridinium perchlorate, Preussmann et al, Justus Liebigs Annalen der Chemie, 1965, 684, 57-61). After cooling, water was added to give a 50 wt.-% solution. $M_w$ and $NC_{ps}$ were measured analogous to Example 1 and are reported in Table 5 a and b.

Example 6

Synthesis of Formose Mixtures FM-1 to FM-4

Example 6.1

Synthesis of the NHC catalyst (1,3,4-Triphenyl-4,5-dihydro-1H-1,2,4-triazol-5-ylidene)

1086 g of thionyl chloride was added to a suspension of 600 g of benzanilide in 4200 mL of toluene within 15 min at room temperature. The reaction mixture was refluxed for 5 hours. The volatiles were removed under vacuum at 80° C. Upon complete removal of volatiles, 2100 mL of toluene was added and completely removed under vacuum at 80° C. The residue was dissolved in 4200 mL THF. The resulting solution was cooled to 25° C. followed by addition of 270 g of triethyl amine and 192 g of phenyl hydrazine. The reaction mixture was stirred for 12 hours at 25° C. The reaction mixture was dried in vacuum and 4000 mL of acetic acid solution (2 wt.-% in water) were added to the residue and warmed to 60° C. The resulting precipitate was cooled to 25° C. and filtered, washed with water to give 683 g of N'-anilino-N-phenyl-benzamidine.

78.5 g ammonium chloride were added to a suspension of 422 g of N'-anilino-N-phenyl-benzamidine in 652 g of triethyl orthoformate. The reaction mixture was refluxed for 4 hours with stirring. The reaction mixture was cooled to room temperature and 800 mL of methanol were added, followed by addition of 635 mL of 25 wt. % solution sodium methoxide in methanol. The mixture was stirred for 30 mins at room temperature. The reaction mixture was filtered. The crude solid obtained was washed with 2 L of water, dried and finally washed with 250 mL methanol to yield 250 g 1,3,4-triphenyl-5-methoxy-1,2,4-triazoline (N-heterocyclic carbene (NHC) compound, nonactivated).

For the activation of the NHC compound, it was recrystallized from methanol in a first step: 50 g of 1,3,4-triphenyl-5-methoxy-1,2,4-triazoline was dissolved in 50 mL of methanol and heated to 62° C. under nitrogen while stirring. After reaching the boiling point, 380 g of methanol was added in portions until the solid was nearly completely dissolved. After stirring for 45 min at 62° C., the mixture was cooled down to room temperature, followed by filtration and washing with methanol. The solid was dried with air, yielding 41.8 g of recrystallized 1,3,4-triphenyl-5-methoxy-1,2,4-triazoline (83.6%). In a second step, 23.9 g of this recrystallized solid was filled into a Schlenk tube, evacuated and purged with argon five times. The tube was heated to 90° C. for 22 h under vacuum (<1 mbar). After cooling down to room temperature, the activated NHC catalyst was stored under argon until use.

Example 6.2

Oligomerization of Formaldehyde

The oligomerization of formaldehyde to C2 and C3 compounds was performed in a glass vessel (250 mL 4-neck round bottom flask or 6 L double walled vessel). The vessel is equipped with a nitrogen or argon stream, a stirrer and condenser.

FM-1

2.00 kg of diisobutyl carbinol was placed in a 6 L double wall vessel and purged with argon. After heating up to 60° C., 541 g of 37 wt.-% aqueous formaldehyde solution was added and the mixture was heated to 90° C. while stirring. 1.99 g of activated NHC catalyst was added rapidly in one portion.

After stirring for 4 h at 95° C., the mixture was cooled down to 80° C. and 200 g of distilled water was added. After stirring for further 30 min, the reaction mixture was cooled down to 22° C. and the phases were separated.

The aqueous phase is used as formose mixture FM-1 for the preparation of the chipboards without any further purification. The water content of FM-1 was determined by coulometric Karl-Fischer titration. The composition of FM-1 was determined by GC measurements as described above. The composition is reported in Table 2.

up while stirring and after reaching 90° C., 4.06 g of the activated NHC catalyst was added rapidly in one portion.

The temperature was increased in 1.5 h to 105° C. The mixture was cooled down to 80° C. and 400 g of distilled water was added. After stirring for further 30 min, the reaction mixture was cooled down to 22° C. and the phases were separated.

The aqueous phase is used as formose mixture FM-4 for the preparation of the chipboards without any further purification. The water content of FM-4 was determined by coulometric Karl-Fischer titration. The composition of FM-4 was determined by GC measurements as described above. The composition is reported in Table 2.

TABLE 2 water content and composition of FM-1 to FM-4

| Sample | GA [wt. %] | GLA [wt. %] | DHA [wt. %] | B1 (GA + GLA + DHA) [wt. %] | weight ratio of compounds in component B1 GA:GLA:DHA | C4/C5/C6 * [wt. %] | others [wt. %] | water [wt. %] |
|---|---|---|---|---|---|---|---|---|
| FM-1 | 7.3 | 7.3 | 4.6 | 19.2 | 38:38:24 | 23.8 | <0.1 | 57.0 |
| FM-2 | 14.2 | 15.2 | 1.0 | 30.4 | 47:50:3 | 8.9 | 0.7 | 60.0 |
| FM-3 | 5.0 | 13.7 | 1.5 | 20.2 | 25:68:7 | 23.8 | 0.1 | 55.9 |
| FM-4 | 11.3 | 15.8 | 1.5 | 28.6 | 40:55:5 | 14.2 | 0.1 | 57.1 |

* this value corresponds to the sum of all signals of the condensation products of formaldehyde with four, five and six carbons (C4/C5/C6)

FM-2

2.00 kg of diisobutyl carbinol and 540 g of 37 wt.-% aqueous formaldehyde solution were placed in a 6 L double wall vessel and purged with argon. The mixture was heated up while stirring and after reaching 80° C., 1.96 of activated NHC catalyst was added rapidly in one portion.

The temperature was increased in 2 h to 105° C. The mixture was cooled down to 80° C. and 200 g of distilled water was added. After stirring for further 30 min, the reaction mixture was cooled down to 22° C. and the phases were separated.

The aqueous phase is used as formose mixture FM-2 for the preparation of the chipboards without any further purification. The water content of FM-2 was determined by coulometric Karl-Fischer titration. The composition of FM-2 was determined by GC measurements as described above. The composition is reported in Table 2.

FM-3

2.00 kg of 2-ethyl-1-hexanol (1998.7 g) and 540 g of 37 wt.-% aqueous formaldehyde solution were placed in a 6 L double wall vessel and purged with argon. The mixture was heated up while stirring and after reaching 88° C., 1.96 of activated NHC catalyst was added rapidly in one portion.

The temperature was increased in 1 h to 105° C. The mixture was cooled down to 80° C. and 200 g distilled water was added. After stirring for further 30 min, the reaction mixture was cooled down to 22° C. and the phases were separated.

The aqueous phase is used as formose mixture FM-3 for the preparation of the chipboards without any further purification. The water content of FM-3 was determined by coulometric Karl-Fischer titration. The composition of FM-3 was determined by GC measurements as described above. The composition is reported in Table 2.

FM-4

4.00 kg of diisobutyl carbinol and 1.08 kg of 37 wt.-% aqueous formaldehyde solution were placed in a 6 L double wall vessel and purged with argon. The mixture was heated Comparative Example 7*

Comparative Binder Composition-1

161 g glucose monohydrate, 146 g fructose and 161 g L-lysine were mixed with 35 g water and slowly heated (110° C. oil bath temperature). At 94° C. the mixture foamed and turned black. The reaction was stopped. The resulting reaction mixture contained a solid and was not completely soluble in water.

Comparative Example 8*

Comparative Binder Composition-2

286 g glucose monohydrate, 260 g fructose and 286 g L-lysine were mixed with 174 g water and slowly heated (100° C. oil bath temperature). At 90° C. the mixture foamed and turned dark brown. The oil bath was removed for 10 minutes. The reaction was heated up again for 10 min to 100° C. until gas formation stopped. After cooling down to RT the mixture was filled in bottles and stored at 60° C. for 48 h.

Comparative Example 9*

Comparative Binder Composition-3

235 g hexamethylene diamine is dissolved in 730 g water. 791 g fructose and 853 g glucose monohydrate were slowly added and stirred at room temperature for one hour.

Comparative Binder Composition-4

22.5 g of carboxymethylcellulose sodium salt (NaCMC, $M_w$ ca. 250,000) was dissolved in 600 g of water. 67.5 g of hexamethylene diamine and 360 g of glucose monohydrate were slowly added and stirred at room temperature for 24 h.

Example 10

Single-Layered Chipboards with Polylysine-2 and DHA in Comparison with State-of-the-Art Binders

Example 10-1

In a mixer, 499 g of Polylysine-2 solution (50 wt.-% in water) was sprayed onto 5.56 kg (5.40 kg dry weight plus 160 g water (from residual particle moisture content) of spruce core layer chips (moisture content 3.0%) while mixing. Immediately, 149 g of a 1,3-dihydroxyacetone solution (50 wt.-% DHA in water) was sprayed onto the mixture while mixing. Finally, 90 g of water was sprayed onto the mixture while mixing to adjust the final moisture of the resinated chips. After addition of the water mixing was continued for 3 min.

The term "resinated chips" is used for the mixture of the chips with the binder composition and additionally added water.

Calculation of the Binder Amount (Polymer(s) A1 and DHA):

(499 g×0.5+149 g×0.5): 5400 g=6.0%

Calculation of the Ratio of Polymer(s) A1 and DHA:

(499 g×0.5):(149 g×0.5)=77:23

Calculation of the Moisture Content of the Chips/Binder Mixture:

Total weight of water=499 g×0.5 (from polylysine solution)+149 g×0.5 (from DHA solution)+90 g (from additional water)+160 g (from chips moisture)=574 g Total weight of solids=499 g×0.5 (from polylysine solution)+149 g×0.5 (from DHA solution)+5400 g (dry chips)=5724 g Resulting moisture content=574 g/5724 g=10.0%

This water content was confirmed by the method analogous to EN 322:1993 as described above resulting in a water content of 10%.

Comparative Example 10-2*

Binder composition-1 was inhomogeneous. Spraying of Binder composition-1 onto the chips wasn't possible. Attempts to mix Binder composition-1 with the chips by pouring the binder composition onto the chips and stirring also failed to give an even mixture, which can be used for the pressing of a chipboard.

Comparative Example 10-3*

In a mixer, a mixture of 404 g of Binder composition-2 and 244 g of water was sprayed onto 5.56 kg (5.40 kg dry weight plus 160 g water from residual particle moisture content) of spruce core layer chips (moisture content 3.0%) while mixing. 90 g of water was sprayed onto the mixture while mixing to adjust the final moisture of the resinated chips. After addition of the water mixing was continued for 3 min.

Comparative Example 10-4*

In a mixer, a mixture of 469 g of Binder composition-3 and 179 g of water was sprayed onto 5.56 kg (5.40 kg dry weight plus 160 g water from residual particle moisture content) of spruce core layer chips (moisture content 3.0 wt.-%) while mixing. 90 g of water was sprayed onto the mixture while mixing to adjust the final moisture of the resinated chips. After addition of the water mixing was continued for 3 min.

Comparative Example 10-5*

In a mixer, 816 g of Binder composition-4 was sprayed onto 5.49 kg (5.40 kg dry weight plus 90 g water (from residual particle moisture content) of spruce core layer chips (moisture content 1.7%) while mixing. 90 g of water was sprayed onto the mixture while mixing to adjust the final moisture of the resinated chips. After addition of the water mixing was continued for 3 min.

Comparative Example 10-6*

In a mixer, 499 g of Polylysine-2 solution (50 wt.-% in water) was sprayed onto 5.47 kg (5.40 kg dry weight plus 70 g water from residual particle moisture content) of spruce core layer chips (moisture content 1.3%) while mixing. Immediately, a solution of 164 g of glucose monohydrate (corresponding to 149 g of glucose) in 320 g of water was sprayed onto the mixture while mixing. After addition of the water mixing was continued for 3 min.

In the comparative examples 10-2* to 10-6* the amount of the comparative binder composition is 6.0% solids referred to dry wood. The solids of the comparative binder compositions (binder composition-2, binder composition-3 and binder composition-4) was calculated from the starting materials as shown in the following example.

Comparative Binder Composition-2:

286 g of glucose monohydrate (260 g glucose+26 g water)

260 g of fructose 286 g of L-lysine 174 g of water

Solid content=(260 g+260 g+286 g)/(260 g+260 g+286 g+26 g+174 g)=80.1%

404 g of binder composition-2 contains 324 g (80.1% of 404 g) of solids. The amount of the comparative binder composition-2 is 6.0% solids referred to dry weight of the wood chips (5.40 kg).

In the comparative examples 10-5* the amount of the comparative binder composition is also 6.0 wt.-% solids referred to dry wood.

Pressing the resinated chips to chipboards (Example 10-1 and comparative examples 10-3* to 10-61 Immediately after resination, 720 g of the chips/binder mixture were scattered into a 30×30 cm mold and pre-pressed under ambient conditions (0.4 N/mm$^2$). Subsequently, the pre-pressed chip mat thus obtained was removed from the mold, transferred into a hot press and pressed to a thickness of 10 mm to give a chipboard (temperature of the press plates 210° C., max pressure 4 N/mm$^2$, pressing time 180 sec, 120 sec or 100 sec).

TABLE 3 single-layered chipboards, 10 mm, with different binder compositions according to the invention and comparative examples, binder amount 6 wt.-% (solids/dry wood).

| Example | A Polymer A1 or CB component | B Component B1 or comparative binder component | Ratio[1] of polymer A1 and B1/glucose | Press time factor [sec/mm] | Density [kg/m³] | Internal bond strength [N/mm²] | 24 h swelling [%] |
|---|---|---|---|---|---|---|---|
| 10-1 | Polylysine-2 | DHA | 77:23 | 18 | 712 | 0.70 | 40 |
| | | | | 12 | 701 | 0.62 | 42 |
| | | | | 10 | 700 | 0.53 | 45 |
| 10-2* | CB-1 (Glucose/fructose/lysine) | | | | n.p. | | |
| 10-3* | CB-2(Glucose/fructose/lysine) | — | — | 18 | 681 | 0.47 | n.q. |
| | | | | 12 | | no board | |
| 10-4* | CB-3 (Glucose/fructose/HMDA) | — | — | 18 | 720 | 0.14 | n.q. |
| | | | | 12 | | no board | |
| 10-5* | CB composition-4 (Glucose/HMDA/NaCMC) | — | — | 18 | 661 | 0.30 | n.q. |
| | | | | 12 | 657 | 0.19 | n.q. |
| | | | | 10 | | No board | |
| 10-6* | Polylysine-2 | Glucose | 77:23 | 18 | 713 | 0.56 | 61 |
| | | | | 12 | 699 | 0.40 | 62 |
| | | | | 10 | | No board | |

*Comparative Example,
CB = Comparative Binder
[1]ratio by weight
n.p. = production of a chip board was not possible, since Comparative Binder-1 is inhomogeneous and cannot be evenly distributed on the chips
n.q. = not quantifiable since test sample fell to pieces within 24 h
"no board" means that the resulting material after pressing was not a sound chipboard and showed fractures, blows and/or bursts.

Table 2 shows that the binder composition according to the present invention allows the production of boards having an improved Internal bond strength compared boards prepared with binder composition known from prior art. Furthermore, the binder composition according to the present invention allows the production of boards at lower press time factors.

Example 11

Single-Layered Chipboards with Polylysine-2 and Glycolaldehyde Dimer (GA-D), Glyceraldehyde (GLA) or 1,3-Dihydroxyacetone (DHA) and Different Ways of Application Separate application of the binder composition to the wood particles (Example 11-1 to 11-8 and comparative examples 11-16* and 11-17*)

In a mixer, an amount x of a solution of A1 (50 wt.-% in water) was sprayed onto 5.56 kg (5.40 kg dry weight) of spruce core layer chips (moisture content 3.0 wt.-%) while mixing. Subsequently, an amount y of a solution of component B1 (50 wt.-% in water) was sprayed onto the mixture while mixing. Finally, an amount z of additional water was sprayed onto the mixture while mixing to adjust the final moisture of the resinated chips. After addition of the water mixing was continued for 3 min. x, y and z are given in Table 4a.

Separate application of the binder composition to the wood particles (Example 11-9) In a mixer, 499 g of Polylysine-2 solution (50 wt.-% in water) was sprayed onto 5.56 kg (5.40 kg dry weight) of spruce core layer chips (moisture content 3.0 wt.-%) while mixing. Subsequently, 149 g of a solution of 1,3-dihydroxyacetone (50 wt.-% in water) was sprayed onto the mixture while mixing. Finally, 90 g of additional water was sprayed onto the mixture while mixing to adjust the final moisture of the resinated chips. After addition of the water mixing was continued for 3 min.

Mixed application of the binder composition to the wood particles (Examples 11-10 to 11-15) 2.20 kg of Polylysine-2 solution (50 wt.-% in water) and 657 g of a 1,3-dihydroxyacetone solution (50 wt. % in water) were mixed by stirring for 1 min at 22° C. After a waiting time of z min (time between end of stirring and start of spraying, during which the mixture was stored at 22° C. as given in Table 4b, 648 g of this mixture was sprayed to 5.56 kg (5.40 kg dry weight) of spruce core layer chips (moisture content 3.0 wt.-%) while mixing. Subsequently, 90 g of water was sprayed onto the mix while mixing to adjust the final moisture of the resinated chips. After addition of the water mixing was continued for 3 min.

TABLE 4a

Amounts of A1, B1 and water

| Example | A1 | Amount of A1 solution (50 wt.-% in water) x [g] | B1 | Amount of B1 solution (50 wt.-% in water) y [g] | Amount of additional water z [g] |
|---|---|---|---|---|---|
| 11-1 | PL-2 | 590 | GLA | 58.5 | 90 |
| 11-2 | PL-2 | 499 | GLA | 149 | 90 |
| 11-3 | PL-2 | 480 | GA-D | 168 | 90 |
| 11-4 | PL-2 | 499 | GA-D | 149 | 90 |
| 11-5 | PL-2 | 499 | DHA | 149 | 90 |
| 11-6 | PL-2 | 499 | DHA | 149 | 90 |
| 11-7 | PL-2 | 832 | DHA | 248 | 0 |
| 11-8 | PL-2 | 832 | DHA | 248 | 0 |
| 11-16* | L-Lysine | 499 | DHA | 149 | 90 |
| 11-17* | L-Lysine | 499 | DHA | 149 | 90 |

*Comparative Example, PL-2 = Polylysine-2
Pressing the resinated chips to chipboards (Examples 11-1 to 11-15 and Comparative Examples 11-16* and 11-17*).

Immediately after resignation, 1.03 kg of the chips/binder composition mixture were spreaded into a 30×30 cm mold and pre-pressed under ambient conditions (0.4 N/mm²). Subsequently, the pre-pressed chip mat thus obtained was removed from the mold, transferred into a hot press and pressed to a thickness of 16 mm to give a chipboard (temperature of the press plates 210° C., max pressure 4 N/mm², pressing time 96 sec).

mixing to adjust the final moisture of the resinated chips. After addition of the water mixing was continued for 3 min.

Preparation of the Resinated Chips (Example 12-13)

In a mixer, 648 g of Lupasol G100 (50 wt.-% of polyetheyleneimine in water) was sprayed onto 5.56 kg TABLE 4b single-layered chipboards, 16 mm, no further components A2, B2, C included

| Example | A1 | B1 | Weight Ratio A1:B1 | Amount A1 + B1 [wt.-%]¹⁾ | Application | Waiting time z [min] | Press time factor [s/mm] | Density [kg/m³] | Internal bond [N/mm²] |
|---|---|---|---|---|---|---|---|---|---|
| 11-1 | PL-2 | GLA | 91:9 | 6 | sep. | — | 6 | 643 | 0.56 |
| 11-2 | PL-2 | GLA | 77:23 | 6 | sep. | — | 6 | 654 | 0.58 |
| 11-3 | PL-2 | GA-D | 74:26 | 6 | sep. | — | 6 | 640 | 0.53 |
| 11-4 | PL-2 | GA-D | 77:23 | 6 | sep. | — | 6 | 648 | 0.52 |
| 11-5 | PL-2 | DHA | 77:23 | 6 | sep. | — | 6 | 656 | 0.44 |
| 11-6 | PL-2 | DHA | 77:23 | 6 | sep. | — | 12 | 646 | 0.48 |
| 11-7 | PL-2 | DHA | 77:23 | 10 | sep. | — | 6 | 655 | 0.88 |
| 11-8 | PL-2 | DHA | 77:23 | 10 | sep. | — | 12 | 657 | 0.98 |
| 11-9 | PL-2 | DHA | 77:23 | 6 | sep.** | — | 6 | 660 | 0.45 |
| 11-10 | PL-2 | DHA | 77:23 | 6 | mix | 1 | 6 | 656 | 0.43 |
| 11-11 | PL-2 | DHA | 77:23 | 6 | mix | 30 | 6 | 657 | 0.41 |
| 11-12 | PL-2 | DHA | 77:23 | 6 | mix | 60 | 6 | 660 | 0.39 |
| 11-13 | PL-2 | DHA | 77:23 | 6 | mix | 90 | 6 | 654 | 0.36 |
| 11-14 | PL-2 | DHA | 77:23 | 6 | mix | 120 | 6 | 649 | 0.30 |
| 11-15 | PL-2 | DHA | 77:23 | 6 | mix | 150 | 6 | 638 | <0.1 |
| 11-16* | L-Lysine | DHA | 77:23 | 6 | sep. | — | 18 | 656 | <0.1 |
| 11-17* | L-Lysine | DHA | 77:23 | 6 | sep. | — | 12 | No board | |

*Comparative Example
PL-2 = Polylysine-2
Waiting time = time between end of mixing of Polylysine-2 and DHA and start of spraying the binder composition mixture onto the chips
sep. = separate application (first A1, second B1)
sep.** = separate application (first B1, second A1)
mix = application of a mixture of A1 and B1
¹⁾amount is given in wt.-% solids per dry wood Table 4b shows that the binder composition according to the present invention, which is polylysine in combination with glyceraldehyde, glycolaldehyde or 1,3-dihydroxyacetone, allows the production of boards having an improved Internal bond strength at shorter press times compared to binder compositions using lysine instead of polylysine.

Example 12

Single-Layered Chipboards with Different Polymers A1 and 1,3-Dihydroxyacetone (DHA)

Preparation of the resinated chips (Examples 12-1* to 12-12 and 12-14) In a mixer, 499 g of L-lysine solution (Comparative Example 12-11 or Polymer(s) A1 solution (50 wt.-% in water) (Example 12-2 to 12-12 and 12-14) was sprayed onto 5.56 kg (5.40 kg dry weight) of spruce core layer chips (moisture content 3.0%) while mixing. Subsequently, 149 g of a 1,3-dihydroxyacetone solution (50 wt.-% DHA in water) was sprayed onto the mixture while mixing. Finally, 90 g of water was sprayed onto the mixture while (5.40 kg dry weight) of spruce core layer chips (moisture content 3.0%) while mixing. Subsequently, 90 g of water was sprayed onto the mixture while mixing to adjust the final moisture of the resinated chips. After addition of the water mixing was continued for 3 min.

Pressing the Resinated Chips to Chipboards (Examples 12-1* to 12-14)

Immediately after resination, 1.10 kg of the chips/binder mixture were scattered into a 30×30 cm mold and pre-pressed under ambient conditions (0.4 N/mm²). Subsequently, the pre-pressed chip mat thus obtained was removed from the mold, transferred into a hot press and pressed to a thickness of 16 mm to give a chipboard (temperature of the press plates 210° C., max pressure 4 N/mm²). The pressing time was 96 sec (Table 5a) or 160 sec (Table 5b).

TABLE 5a single-layered chipboards, 16 mm, binder amount (polymer A1 + component
B1 or lysine + component B1):6 wt.-% (solids/dry wood), separate application,
press time factor 6 sec/mm, no further components B2, A2 and C included.

| Example | Polymer(s) A1 or comparative component | $NC_{ps}$ of polymer A1 [wt.-%] | $M_w$ of A1 or molecular weight of comparative component[1] [g/mol] | B1 | Weight ratio A1:B1 | Density [kg/m³] | Internal bond [N/mm²] |
|---|---|---|---|---|---|---|---|
| 12-1a* | L-Lysine | 19.2 | 146 | DHA | 77:23 | No board | |
| 12-2a | Polylysine-1 | 11.0 | 1510 | DHA | 77:23 | 658 | 0.35 |
| 12-3a | Polylysine-2 | 10.5 | 2010 | DHA | 77:23 | 669 | 0.46 |
| 12-4a | Polylysine-3 | 10.2 | 2240 | DHA | 77:23 | 671 | 0.44 |
| 12-5a | Polylysine-4 | 9.80 | 2740 | DHA | 77:23 | 668 | 0.48 |
| 12-6a | Polylysine-5 | 9.50 | 3360 | DHA | 77:23 | 676 | 0.44 |
| 12-7a | Polylysine-6 | 9.15 | 3690 | DHA | 77:23 | 683 | 0.51 |
| 12-8a | Polylysine-7 | 9.68 | 2180 | DHA | 77:23 | 674 | 0.42 |
| 12-9a | Polylysine-8 | 9.88 | 2380 | DHA | 77:23 | 678 | 0.44 |
| 12-10a | Polyamide-9 | 6.48 | 10600 | DHA | 77:23 | 680 | 0.72 |
| 12-11a | Polyamide-10 | 10.4 | 17600 | DHA | 77:23 | 699 | 0.71 |
| 12-12a | Polyethyleneimine (Lupasol G100) | 15.4 | 4730 | DHA | 77:23 | 692 | 0.59 |
| 12-13a* | Polyethyleneimine (Lupasol G100) | 15.4 | 4730 | — | — | No board | |
| 12-14a | Polylysine-11 | 5.56 | 11080 | DHA | 77:23 | 675 | 0.25 |

*Comparative Examples
[1] $M_w$ of the polymers A1 are measured by size exclusion chromatography.

TABLE 5b single-layered chipboards, 16 mm, binder amount (polymer A1 + component
B1 or lysine + component B1):6 wt.-% (solids/dry wood), separate application,
press time factor 10 sec/mm, no further components A2, B2, C included.

| Example | Polymer(s) A1 or comparative component | $NC_{ps}$ of polymer A1 [wt.-%] | $M_w$ of A1 or molecular weight of comparative component[1] [g/mol] | B1 | Weight ratio A1:B1 | Density [kg/m³] | Internal bond [N/mm²] |
|---|---|---|---|---|---|---|---|
| 12-1b* | L-Lysine | 19.2 | 146 | DHA | 77:23 | No board[2] | |
| 12-2b | Polylysine-1 | 11.0 | 1510 | DHA | 77:23 | 695 | 0.41 |
| 12-3b | Polylysine-2 | 10.5 | 2010 | DHA | 77:23 | 700 | 0.53 |
| 12-4b | Polylysine-3 | 10.2 | 2240 | DHA | 77:23 | 696 | 0.56 |
| 12-5b | Polylysine-4 | 9.80 | 2740 | DHA | 77:23 | 693 | 0.58 |
| 12-6b | Polylysine-5 | 9.50 | 3360 | DHA | 77:23 | 674 | 0.43 |
| 12-7b | Polylysine-6 | 9.15 | 3690 | DHA | 77:23 | 700 | 0.45 |
| 12-8b | Polylysine-7 | 9.68 | 2180 | DHA | 77:23 | 685 | 0.52 |
| 12-9b | Polylysine-8 | 9.88 | 2380 | DHA | 77:23 | 693 | 0.51 |
| 12-10b | Polyamide-9 | 6.48 | 10600 | DHA | 77:23 | 679 | 0.82 |
| 12-11b | Polyamide-10 | 10.4 | 17600 | DHA | 77:23 | 711 | 0.75 |
| 12-12b | Polyethyleneimine** | 15.4 | 4730 | DHA | 77:23 | 701 | 0.65 |
| 12-13b* | Polyethyleneimine** | 15.4 | 4730 | — | — | No board | |
| 12-14b | Polylysine-11 | 5.56 | 11080 | DHA | 77:23 | 684 | 0.28 |

*Comparative Examples
**Lupasol G100
[1] $M_w$ of the polymers A1 are measured by size exclusion chromatography.
[2] No board was obtained also when a higher binder amount of binder was used (10% of L-Lysine and DHA (77:23) instead of 6% of L-lysine and DHA (77:23).

Example 13

Single-Layered Chipboards with Polylysine-2 and DHA and Paraffin Emulsion

Mixed application of the binder composition to the wood chips (Examples 13-1 to 13-3) 2.20 kg of Polylysine-2 solution (50 wt.-% in water) and 657 g of a 1,3-dihydroxyacetone solution (50 wt. % DHA in water) were mixed by stirring for 1 min at 22° C. In a mixer 648 g of this mixture was sprayed either immediately after mixing or after a waiting time (stored in a closed box at 22° C.) as given in the Table 3, to 5.56 kg (5.40 kg dry weight) of spruce core layer chips (moisture content 3.0%) while mixing. Subsequently, a mixture of 45.0 g HydroWax 138 (60 wt.-% paraffin in water) and 72.0 g of water was sprayed onto the mix while mixing. After addition mixing was continued for 3 min.

Pressing the resinated chips to chipboards (Examples 13-1 to 13-3) Immediately after resination, 1.11 kg of the chips/binder mixture were scattered into a 30×30 cm mold and pre-pressed under ambient conditions (0.4 N/mm²). Subsequently, the pre-pressed chip mat thus obtained was removed from the mold, transferred into a hot press and pressed to a thickness of 16 mm to give a chipboard (temperature of the press plates 210° C., max pressure 4 N/mm², pressing time 96 sec).

TABLE 6 single-layered chipboards, 16 mm, binder amount (polymer A1 + component B1):6 wt.-% (solids/dry wood), C1 = paraffin, press time factor = 6 sec/mm, no further components A2, B2 included.

| Example | Polymer A1 | B1 | Weight ratio A1:B1 | Weight ratio A1:B1:C1 | Amount of C1 [wt.-%]* | Waiting time [min] | Density [kg/m³] | Internal bond [N/mm²] | 24 h swelling [%] |
|---|---|---|---|---|---|---|---|---|---|
| 13-1 | PL-2 | DHA | 77:23 | 71:21:8 | 0.5 | 1 | 657 | 0.44 | 38 |
| 13-2 | PL-2 | DHA | 77:23 | 71:21:8 | 0.5 | 30 | 656 | 0.40 | 39 |
| 13-3 | PL-2 | DHA | 77:23 | 71:21:8 | 0.5 | 60 | 654 | 0.40 | 42 |
| 11-10 | PL-2 | DHA | 77:23 | 77:23:0 | 0 | 1 | 656 | 0.43 | 41 |
| 11-11 | PL-2 | DHA | 77:23 | 77:23:0 | 0 | 30 | 657 | 0.41 | 43 |
| 11-12 | PL-2 | DHA | 77:23 | 77:23:0 | 0 | 60 | 660 | 0.39 | 44 |

*amount is given in wt.-% solids per dry wood
Waiting time = time between end of mixing of Polylysine-2 and DHA and start of spraying the binder composition mixture onto the chips
PL-2 = Polylysine-2

Table 6 shows that the addition of paraffine improves swelling properties.

Example 14

Single-Layered Chipboards with Polylysine-2 and Different Amounts of 1,3-Dihydroxyacetone In a mixer, an amount x of Polylysine-2 solution (50 wt.-% in water) as given in Table 7 was sprayed onto 5.56 kg (5.40 kg dry weight) of spruce core layer chips (moisture content 3.0%) while mixing.

Subsequently, an amount y of a 1,3-dihydroxyacetone solution (50 wt.-% DHA in water) as given in Table 7 was sprayed onto to the mixture while mixing. Finally, 90 g of water was sprayed onto the mixture while mixing to adjust the final moisture of the resinated chips. After addition of the water mixing was continued for 3 min.

TABLE 7

| Example | Amount of Polylysine-2 solution (50 wt.-% in water) x [g] | Amount of DHA solution (50 wt.-% in water) y [g] |
|---|---|---|
| 14-1 | 64.8 | 583 |
| 14-2 | 214 | 434 |
| 14-3 | 259 | 389 |
| 14-4 | 324 | 324 |
| 14-5 | 421 | 227 |
| 14-6 | 486 | 162 |
| 14-7 | 518 | 130 |

Immediately after resination, 1.10 kg of the chips/binder mixture were scattered into a 30×30 cm mold and pre-pressed under ambient conditions (0.4 N/mm²). Subsequently, the pre-pressed chip mat thus obtained was removed from the mold, transferred into a hot press and pressed to a thickness of 16 mm to give a chipboard (temperature of the press plates 210° C., max pressure 4 N/mm², pressing time 96 sec)

TABLE 8 single-layered chipboards, 16 mm, binder amount (polymer A1 + component B1):6 wt.-% (solids/dry wood), separate application, press time factor 6 sec/mm, no further components A2, B2, C included.

| Example | A1 | B1 | Weight ratio A1:B1 | Number ratio X | Density [kg/m³] | Internal bond [N/mm²] |
|---|---|---|---|---|---|---|
| 14-1 | Polylysine-2 | DHA | 10:90 | 0.07:1 | | No board |
| 14-2 | Polylysine-2 | DHA | 33:67 | 0.34:1 | 640 | 0.24 |
| 14-3 | Polylysine-2 | DHA | 40:60 | 0.45:1 | 641 | 0.30 |
| 14-4 | Polylysine-2 | DHA | 50:50 | 0.67:1 | 634 | 0.37 |
| 14-5 | Polylysine-2 | DHA | 65:35 | 1.25:1 | 652 | 0.49 |
| 14-6 | Polylysine-2 | DHA | 75:25 | 2.01:1 | 650 | 0.59 |
| 14-7 | Polylysine-2 | DHA | 80:20 | 2.68:1 | 648 | 0.57 |

Number ratio X = number ratio of the amine groups of polylysine-2 and the keto functions of 1,3-dihydroxyacetone Table 8 clearly shows that the number ratio of the sum of the numbers of primary and secondary amine groups of polymer A1 to the sum of the numbers of aldehyde and keto groups of component B1 should be at least 0.3:1. Preferably the number ratio of the sum of the numbers of primary and secondary amine groups of polymer A1 to sum of the numbers of aldehyde and keto groups of component B1 should be larger than 1.

Example 15

Single-Layered Chipboards with Polylysine-2 (PL-2) and Formose Mixtures FM-1 to FM-4

In a mixer, 5.56 kg (5.40 dry weight) of spruce particles (core layer particles; moisture content 3.0 wt.-%) were mixed with 499 g of a solution of Polylysine-2 (50 wt.-% in water). Subsequently an amount y of Component B as defined in Table 9 was added into the mixer while mixing. Finally, an amount z of additional water was sprayed onto the mix while mixing to adjust the final moisture of the resinated particles. After addition of the water mixing was continued for 3 min.

TABLE 9

| Example | B | Amount of B y [g] | Concentration of B1 in B [wt.-%] | Amount of additional water z [g] |
|---|---|---|---|---|
| 13-1 | FM-1 | 174 | 19.2 | 113 |
| 13-2 | FM-2 | 187 | 30.4 | 97 |
| 13-3 | FM-3 | 168 | 20.2 | 115 |
| 13-4 | FM-4 | 173 | 28.6 | 110 |

TABLE 9-continued

| Example | B | Amount of B y [g] | Concentration of B1 in B [wt.-%] | Amount of additional water z [g] |
|---|---|---|---|---|
| 13-5 | DHA (50 wt. % in water) | 113 | 50.0 | 96 |
| 13-6 | GLA (50 wt. % in water) | 113 | 50.0 | 96 |

TABLE 10 single-layered chipboards, 16 mm, separate application, press time factor 6 s/mm no further components A2, B2, C included.

| Example | A1 | Amount A1 [%/dry wood] | B | Amount B1 [%/dry wood] | weight ratio A1:B1 | weight ratio of compounds in component B1 GA:GLA:DHA | Density [kg/m$^3$] | Internal bond [N/mm$^2$] |
|---|---|---|---|---|---|---|---|---|
| 13-1 | PL-2 | 4.62 | FM-1 | 0.62 | 88:22 | 38:38:24 | 673 | 0.78 |
| 13-2 | PL-2 | 4.62 | FM-2 | 1.05 | 81:19 | 47:50:3 | 664 | 0.63 |
| 13-3 | PL-2 | 4.62 | FM-3 | 0.63 | 88:22 | 25:68:7 | 659 | 0.57 |
| 13-4 | PL-2 | 4.62 | FM-4 | 0.92 | 83:17 | 40:55:5 | 664 | 0.57 |
| 13-5 | PL-2 | 4.62 | DHA | 1.05 | 81:19 |  | 658 | 0.44 |
| 13-6 | PL-2 | 4.62 | GLA | 1.05 | 81:19 |  | 661 | 0.42 |

PL-2 = Polylysine-2

Table 10 shows that boards prepared with a binder composition comprising a mixture of glyceraldehyde, glycolaldehyde and 1,3-dihydroxyacetone as component B1 provide a higher internal bond strength than boards prepared with pure glyceraldehyde or pure 1,3-dihydroxyacetone as component B-1.

Example 16

Plastic Material 50 g of Polylysine-2 (50 wt.-% in water) and 7.5 g of 1,3-dihydroxyacetone (weight ratio A1 to B1=77:23) were mixed in a speed mixer for 1 min at 2000 rpm. Straight after that the mixture was poured in a metal form for rods. The form is placed in an oven at 120° C. for 90 min and for further 90 min at 180° C. After cooling down to RT the form was removed and dark brown to black rods were obtained.

Example 17

Three-layered chipboards with Polylysine-2 solution and HA-1 in the surface layer and standard urea formaldehyde resin in the core layer Preparation of Resinated Core Layer Chips (for Comparative Examples 17-1*, 17-2* and 17-10* and Examples 17-3 to 17-9)

In a mixer, a mixture of 748 g of Kaurit glue 350 (65% solid content) and 22.4 g of ammonium sulfate was sprayed onto 5.58 kg (5.40 kg dry weight) of spruce core layer chips (moisture content 3.4%) while mixing. Subsequently, 95.0 g of water was sprayed onto the mixture to adjust the final moisture of the resinated chips while mixing. Thereafter, mixing was continued for 3 min.

Preparation of the Resinated Surface Layer Chips (Comparative Example 17-11

In a mixer, a solution of 42.3 g of HMDA, 154 g of glucose monohydrate and 142 g of fructose in 312 g of water was sprayed onto 5.67 kg (5.40 kg dry weight) of spruce surface layer chips (moisture content 5.0%) while mixing. Thereafter, mixing was continued for 3 min.

Preparation of the Resinated Surface Layer Chips (Comparative Example 17-21

In a mixer, 84.6 g of Polylysine-2 solution (50 wt.-% in water) was sprayed onto 5.67 kg (5.40 kg dry weight) of spruce surface layer chips (moisture content 5.0%) while mixing. Subsequently, a solution of 154 g of glucose monohydrate and 142 g of fructose in 270 g of water was sprayed onto the mixture while mixing. Thereafter, mixing was continued for 3 min.

Preparation of the Resinated Surface Layer Chips (Example 17-3)

In a mixer, 486 g of Polylysine-2 solution (50 wt.-% in water) was sprayed onto 5.67 kg (5.40 kg dry weight) of spruce surface layer chips (moisture content 5.0%) while mixing. Subsequently, 162 g of a 1,3-dihydroxyacetone solution (50 wt.-% DHA in water) was sprayed onto the mixture while mixing. Thereafter, mixing was continued for 3 min.

Preparation of the Resinated Surface Layer Chips (Example 17-4)

In a mixer, a mixture of 486 g of Polylysine-2 solution (50 wt.-% in water) and 162 g of urea was sprayed onto 5.67 kg (5.40 kg dry weight) of spruce surface layer chips (moisture content 5.0%) while mixing. Subsequently, 162 g of a 1,3-dihydroxyacetone solution (50 wt.-% DHA in water) was sprayed onto the mixture while mixing. Thereafter, mixing was continued for 3 min.

Preparation of the Resinated Surface Layer Chips (Example 17-5)

In a mixer, a mixture of 486 g of Polylysine-2 solution (50 wt.-% in water) and 81 g of urea was sprayed onto 5.67 kg (5.40 kg dry weight) of spruce surface layer chips (moisture content 5.0%) while mixing. Subsequently, 162 g of a 1,3-dihydroxyacetone solution (50 wt.-% DHA in water) was sprayed onto the mixture while mixing. Thereafter, mixing was continued for 3 min.

Preparation of the Resinated Surface Layer Chips (Example 17-6)

In a mixer, a mixture of 564 g of Polylysine-2 (50 wt.-% in water) and 162 g of urea was sprayed onto 5.67 kg (5.40 kg dry weight) of spruce surface layer chips (moisture content 5.0%) while mixing. Subsequently, 84.2 g of a 1,3-dihydroxyacetone solution (50 wt.-% DHA in water) was sprayed onto the mixture while mixing. Thereafter, mixing was continued for 3 min.

Preparation of the Resinated Surface Layer Chips
(Example 17-7)

In a mixer, a mixture of 564 g of Polylysine-2 solution (50 wt.-% in water) and 81 g of urea was sprayed onto 5.67 g (5.40 kg dry weight) of spruce surface layer chips (moisture content 5.0%) while mixing. Subsequently, 84.2 g of a 1,3-dihydroxyacetone solution (50 wt.-% DHA in water) was sprayed onto the mixture while mixing. Thereafter, mixing was continued for 3 min.

Preparation of the Resinated Surface Layer Chips
(Example 17-8)

In a mixer, a mixture of 356 g of Polylysine-2 solution (50 wt.-% in water) and 162 g of urea was sprayed onto 5.67 kg (5.40 kg dry weight) of spruce surface layer chips (moisture content 5.0%) while mixing. Subsequently, 292 g of a 1,3-dihydroxyacetone solution (50 wt.-% DHA in water) was sprayed onto the mixture while mixing. Thereafter, mixing was continued for 3 min.

Preparation of the Resinated Surface Layer Chips
(Example 17-9)

In a mixer, a mixture of 356 g of Polylysine-2 solution (50 wt.-% in water) and 81 g of urea was sprayed onto 5.67 g (5.40 kg dry weight) of spruce surface layer chips (moisture content 5.0%) while mixing. Subsequently, 292 g of a 1,3-dihydroxyacetone solution (50 wt.-% DHA in water) was sprayed onto the mixture while mixing. Thereafter, mixing was continued for 3 min.

Preparation of the Resinated Surface Layer Chips
(Comparative Example 17-101)

In a mixer, a mixture of 748 g of Kaurit glue 350 (65% solid content), 14.6 g of ammonium sulfate and 80.0 g of water was sprayed onto 5.67 kg (5.40 kg dry weight) of spruce surface layer chips (moisture content 5.0%) while mixing. Thereafter, mixing was continued for 3 min.

Pressing the Resinated Chips to Chipboards
(Comparative Examples 17-1*, 17-2* and 17-10*
and Examples 17-3 to 17-9)

Immediately after resination, 452 g of resinated surface layer chips, followed by 1807 g of resinated core layer chips, followed by 452 g of resinated surface layer chips, were scattered into a 56,5×44 cm mold and pre-pressed under ambient conditions (0.4 N/cm 2). Subsequently, the pre-pressed chip mat thus obtained was removed from the mold, transferred into a hot press and pressed to a thickness of 16 mm to give a chipboard (temperature of the press plates 210° C., max pressure 4 N/mm$^2$, 96 s or 128 s corresponding to a press time factor of 6 s/mm or 8 s/mm (board thickness was adjusted by two steel spacing strips which were inserted in the press).

TABLE 11

3-layered chipboards, 16 mm, binder in core layer:Kaurit glue 350 9 wt.-% (solid/dry wood), binder in surface layer as given, binder amount in surface layer (components A1 + B1 + B2):6 wt.-%,

| Example | Polymer(s) A1 or comparative component | A2 | DHA (B1) | B2 | Weight ratio A1:B1:B2 | Weight ratio A2:(A1 + B1 + B2) | press time factor [s/mm] | Density [kg/m$^3$] | Internal bond [N/mm$^2$] | Formaldehyde emission [mg/m$^2$h] |
|---|---|---|---|---|---|---|---|---|---|---|
| 17-1* | HMDA | — | — | Fru/Glu[1)] | 13:0:87 | | 6 | 655 | 0.34 | 4.2 |
| | | | | | | | 8 | 658 | 0.34 | 4.4 |
| 17-2* | Polylysine-2 | — | — | Fru/Glu[1)] | 13:0:87 | | 6 | 652 | 0.42 | 4.3 |
| | | | | | | | 8 | 656 | 0.43 | 4.3 |
| 17-3 | Polylysine-2 | — | DHA | | 75:25:0 | | 6 | 665 | 0.79 | 1.7 |
| | | | | | | | 8 | 666 | 0.80 | 1.6 |
| 17-4 | Polylysine-2 | Urea | DHA | | 75:25:0 | 50:100[2)] | 6 | 667 | 0.85 | 1.3 |
| | | | | | | | 8 | 672 | 0.90 | 1.3 |
| 17-5 | Polylysine-2 | Urea | DHA | | 75:25:0 | 25:100[3)] | 6 | 669 | 0.90 | 1.5 |
| | | | | | | | 8 | 678 | 0.91 | 1.4 |
| 17-6 | Polylysine-2 | Urea | DHA | | 87:13:0 | 50:100[4)] | 6 | 663 | 0.84 | 1.1 |
| | | | | | | | 8 | 665 | 0.84 | 1.0 |
| 17-7 | Polylysine-2 | Urea | DHA | | 87:13:0 | 25:100[5)] | 6 | 661 | 0.80 | 1.2 |
| | | | | | | | 8 | 670 | 0.81 | 1.2 |
| 17-8 | Polylysine-2 | Urea | DHA | | 55:45:0 | 50:100[6)] | 6 | 663 | 0.73 | 1.6 |
| | | | | | | | 8 | 662 | 0.75 | 1.5 |

TABLE 11-continued 3-layered chipboards, 16 mm, binder in core layer:Kaurit glue 350 9 wt.-% (solid/dry wood), binder
in surface layer as given, binder amount in surface layer (components A1 + B1 + B2):6 wt.-%,

| Example | binder in surface layer | | | Weight ratio A1:B1:B2 | Weight ratio A2:(A1 + B1 + B2) | press time factor [s/mm] | Density [kg/m$^3$] | Internal bond [N/mm$^2$] | Formaldehyde emission [mg/m$^2$h] |
|---|---|---|---|---|---|---|---|---|---|
| | Polymer(s) A1 or comparative component | A2 | DHA (B1) | B2 | | | | | |
| 17-9 | Polylysine-2 | Urea | DHA | | 55:45:0 | 25:100[7] | 6 | 664 | 0.69 | 1.7 |
| | | | | | | | 8 | 664 | 0.71 | 1.6 |
| 17-10* | UF resin (Kaurit glue 350) 9.0 wt.-% (solid/dry wood) | | | | | | 8 | 690 | 0.87 | 2.7 |

*Comparative Examples
[1] weight ratio Fructose (Fru):Glucose (Glu) = 50:50
[2] weight ratio of Urea to Polylysine-2 = 40:60
[3] weight ratio of Urea to Polylysine-2 = 25:75
[4] weight ratio of Urea to Polylysine-2 = 36:64
[5] weight ratio of Urea to Polylysine-2 = 22:78
[6] weight ratio of Urea to Polylysine-2 = 48:52
[7] weight ratio of Urea to Polylysine-2 = 31:69

3-layered chipboards with UF-resin in core layer and a binder according to the present invention in the surface layer have a reduced formaldehyde emission. The addition of urea as component A2 further reduces formaldehyde emission.

Example 18

11 mm Single-Layer Chipboards by Pressing in a High-Frequency Press

Preparation of the resinated chips (Examples 18-1 to 18-7)

In a mixer, an amount x1 of Polylysine-2 solution (50 wt.-% in water) or an amount x2 of a solution of L-Lysine (50 wt.-% in water) as given in Table 12 was sprayed onto 5.56 kg (5.40 kg dry weight) of spruce core layer chips (moisture content 3.0%) while mixing. Subsequently, an amount y of a 1,3-dihydroxyacetone solution (50 wt.-% DHA in water) as given in Table 7 was sprayed onto to the mixture while mixing. Finally, 90 g of water was sprayed onto the mixture while mixing to adjust the final moisture of the resinated chips. After addition of the water mixing was continued for 3 min.

TABLE 12

| Example | Amount of Polylysine-2 solution (50 wt.-% in water) x1 [g] | Amount of L-Lysine solution (50 wt.-% in water) x2 [g] | Amount of DHA solution (50 wt.-% in water) y [g] |
|---|---|---|---|
| 18-1 | 583 | | 64.8 |
| 18-2 | 518 | | 130 |
| 18-3 | 499 | | 149 |
| 18-4 | 454 | | 194 |
| 18-5 | 389 | | 259 |
| 18-6 | 259 | | 389 |
| 18-7* | | 499 | 149 |

Preparation of the Resinated Chips (Comparative Example 18-8)

In a mixer, 499 g of a solution of L-Lysine (50 wt.-% in water) was sprayed onto 5.56 kg (5.40 kg dry weight) of spruce core layer chips (moisture content 3.0%) while mixing. Subsequently, an solution of 81.9 g of glucose monohydrate in 157 g of water was sprayed onto to the mixture while mixing. The mixing was continued for 3 min.

Pressing the Resinated Chips to Chipboards in a High-Frequency Press (Examples 18-1 to 18-8)

Immediately after resination, 640 g of the resinated chips were scattered into a 30×30 cm mold and pre-pressed under ambient conditions (0.4 N/mm$^2$). Subsequently, the pre-pressed chip mat thus obtained was removed from the mold. For monitoring a temperature sensor (GaAs chip) was introduced into the center of said pre-pressed chip mat. Nonwoven separators were then provided to the upper and lower side of the pre-pressed chip mat. The pre-pressed chip mat was inserted in a HLOP 170 press from Hoefer Presstechnik GmbH, whereby a birch plywood (thickness 6 mm) was placed between the nonwoven separator and the press plate on each side of the mat. The pre-pressed chip mat was then compacted to 11 mm thickness in the press within a period of 2 s, and then heated by applying a high-frequency electrical field (27.12 MHz, anode current 2.5 A) while the press was remaining closed. When the target temperature 130° C. ("HF temperature") was reached in the center of the pressed mat, the press was opened.

TABLE 13 single-layered chipboards (high frequency press), 11 mm, binder amount (components
A1 + B1):6 wt.-% (solids/dry wood), no further components A2, B2, C included

| Example | Polymer A1 or comparative binder component | DHA (B1) or Glu | Weight ratio A1:B1 or A1:Glu | HF temperature [° C.] | HF time [sec] | Density [kg/m$^3$] | Internal bond [N/mm$^2$] | 24 h swelling [%] |
|---|---|---|---|---|---|---|---|---|
| 18-1 | PL-2 | DHA | 90:10 | 130 | 68 | 613 | 0.75 | 52 |
| 18-2 | PL-2 | DHA | 80:20 | 130 | 68 | 616 | 0.83 | 42 |
| 18-3 | PL-2 | DHA | 77:23 | 130 | 69 | 630 | 0.94 | 42 |
| 18-4 | PL-2 | DHA | 70:30 | 130 | 69 | 617 | 0.72 | 43 |
| 18-5 | PL-2 | DHA | 60:40 | 130 | 72 | 614 | 0.56 | 47 |
| 18-6 | PL-2 | DHA | 40:60 | 130 | 73 | 610 | 0.19 | 89 |
| 18-7* | L-Lysine | DHA | 77:23[1] | 130 | 82 | | no board | |
| 18-8* | L-Lysine | Glu | 77:23[2] | 130 | 59 | | no board | |

[1] ratio L-Lysine:B1 is given instead of A1:B1
[2] ratio L-Lysine:Glucose is given instead of A1:B1
*comparative example
Glu = Glucose Table 13 clearly shows that the internal bond strength as well as 24 h swelling properties improves in case Polymer(s) A1 is used in excess.

The invention claimed is:

1. A binder composition comprising
a) component A comprising polymer(s) A1 having primary and/or secondary amino groups wherein polymer A1 has (have) a NC$_{ps}$ of at least 1 wt.-%, wherein the polymer(s) A1 comprise(s) polymerization product of
   i) amino acids, and/or
   ii) amines comprising at least two amino groups, wherein the amines are no amino acids, and amino acids, and/or
   iii) amines comprising at least two amino groups, wherein the amines are no amino acids, and di and/or tricarboxylic acids, and optionally amino acids and/or
   iv) at least two compounds defined in i) to iii),
and
b) component B comprising component B1 which is 1,3-dihydroxyacetone, glycolaldehyde, glyceraldehyde or any mixture thereof, wherein polymer A1 has (have) a total weight average molecular weight M$_{w,total}$ of at least 800 g/mol, wherein the number ratio of the sum of the numbers of primary and secondary amine groups of Component A1 to sum of the numbers of aldehyde and keto groups of component B1 is from 10:1 to 0.3:1.

2. A binder composition according to claim 1, wherein polymer A1 has (have) a total weight average molecular weight M$_{w,total}$ of at least 1000 g/mol and at most 20,000 g/mol.

3. A binder composition according to claim 1, wherein component B1 is a mixture of 1,3-dihydroxyacetone, glycolaldehyde and glyceraldehyde.

4. A binder composition according to claim 1, wherein component B1 is a mixture consisting of
   1 to 30 wt.-% 1,3-dihydroxyacetone,
   10 to 50 wt.-% glycolaldehyde and 20 to 80 wt.-% glyceraldehyde,
   based on the total weight of component B1, wherein the weight amounts of 1,3-dihydroxyacetone, glycolaldehyde, and glyceraldehyde in total are selected such that the total weight of the sum of dihydroxyacetone, glycolaldehyde, and glyceraldehyde is 100 wt. %.

5. A binder composition according to claim 1 comprising at least 10 wt.-% to 95 wt.-% polymer(s) A1 based on the total weight of the sum of polymer(s) A1 and component B1.

6. A binder composition according to claim 1, wherein polymer(s) A1 comprise(s) or consist(s) of branched polymer(s).

7. A binder composition according to claim 6, wherein polymer(s) A1 comprise(s) or consist(s) of branched polymer(s) having a degree of branching of at least 0.05.

8. A binder composition according to claim 1, wherein the polymer A1 comprise(s) at least one polymer selected from the group consisting of
   (i) polyalkyleneimines,
   (ii) polyamides,
   iii) block copolymers comprising polyalkleneimine segments and polyamide segments,
   (iv) graft copolymers comprising polyalkyleneimine segments and polyamide segments and
   (v) mixtures of at least two of (i), (ii), (iii) and/or (iv).

9. A binder composition according to claim 1,
   wherein polymer(s) A1 comprises a polymerization product of amino acids, wherein optionally at least 50 wt.-% amino acids are used as monomers for the polymerization reaction based on total amount of monomers.

10. A binder composition according to claim 9, wherein for the polymerization of 100 g polymer(s) A1 at least 15 g diamino carboxylic acid(s) are used.

11. A binder composition according to claim 1, wherein the polymer(s) A1 comprise(s) or consist(s) of poly (amino acids).

12. A binder composition according to claim 1 wherein the binder composition comprises 50 to 90 wt.-%, of polymer(s) A1, and 10 to 50 wt.-%, of component B1, based on the total weight of the sum of polymer(s) A1 and component B1, wherein the weight amounts of the polymer(s) A1 and component B1 are selected such that the total weight of the sum of polymer(s) A1 and component B1 is 100 wt.-%.

13. A binder composition according to claim 1, wherein the polymer(s) A1 comprise(s) or consist(s) of polylysine(s).

14. A binder composition according to claim 1, wherein the polymer(s) A1 comprise(s) or consist(s) of at least one a polymerization product of:
   i) 1,2-ethylenediamine, 1,3-propylenediamine, bis-(3-aminopropyl) amine, N-(2-aminoethyl)-1,3-propylenediamine, bis-(2-aminoethyl) amine, bis-N-(2-aminoethyl)-1,3-propylenediamine, N,N'-bis-(3- aminopropyl)-1,2-ethylenediamine, N,N-bis-(3-aminopropyl)-1,2-ethylenediamine, or mixtures thereof and ii) adipic acid, succinic acid or mixtures thereof.

15. A reacted binder composition obtained by reacting the binder components A and B according to claim 1.

16. A plastic material comprising the reaction product of component A and B according to claim 1.

17. A composition kit comprising the binder composition according to claim 1, wherein component A and component B are stored separately.

18. A lignocellulosic composite article comprising a plurality of lignocellulosic pieces, and a binder composition according to claim 1 or a reacted binder composition obtained by reacting the binder components A and B according to claim 1.

19. The lignocellulosic composite article according to claim 18, wherein the article is plywood, an oriented strand board, a chip board and/or a fiber board.

20. A multi-layer particle board comprising at least one core layer and at least one surface layer, wherein the surface layer comprises a binder composition according to claim 1 and the core layer comprises a binder selected form the group consisting of urea/formaldehyde binder, phenol/formaldehyde binder, melamine/urea/formaldehyde binder, PMDI binder and mixtures thereof.

21. The multi-layer particle board according to claim 20, wherein the formaldehyde emission measured according to EN 717-2 is lower than 2.0 mg/m²h.

22. A lignocellulosic composite article comprising a plurality of lignocellulosic pieces, and a binder composition according to claim 1 or a reacted composition obtainable or obtained by reacting the binder components A and B according to claim 1 or a multi-layer particle board comprising at least one core layer and at least one surface layer, wherein the surface layer comprises a binder composition according to claim 1 and the core layer comprises a binder selected form the group consisting of urea/formaldehyde binder, phenol/formaldehyde binder, melamine/urea/formaldehyde binder, PMDI binder and mixtures thereof, wherein 3 to 15 wt.-% polymer(s) A1 and component B1 in total based on the total oven-dry weight of the lignocellulosic pieces are used for the preparation of the lignocellulosic composite article.

23. A process for the batchwise or continuous production of lignocellulosic composite articles which are single-layered lignocellulose-based boards or of multi-layered lignocellulose-based boards with a core and with at least one upper and one lower surface layer, comprising the following steps:
   a) mixing the lignocellulosic particles with a binder composition for each layer, wherein the mixture for at least one layer comprises the binder composition according to claim 1,
   b) layer-by-layer scattering of the mixtures of the individual layers to form a mat,
   c) pressing the mat to a board at a temperature of 80 to 300° C. and at a pressure of 1 to 100 bar or
   c') pressing the mat to a board at a temperature of 80 to 200° C. and at a pressure of 0.1 to 100 bar, wherein a high-frequency electrical field is applied during pressing until 80 to 200° C. is reached in the center of the mat.

24. A process according to claim 23 with a core and with at least one upper and one lower surface layer, wherein the surface layer comprises a binder composition comprising:
   a) component A comprising polymer(s) A1 having primary and/or secondary amino groups wherein polymer(s) A1 has (have) a $NC_{ps}$ of at least 1 wt.-%, wherein the polymer(s) A1 comprise(s) polymerization product(s) of
      v) amino acids, and/or
      vi) amines comprising at least two amino groups, wherein the amines are no amino acids, and amino acids, and/or
      vii) amines comprising at least two amino groups, wherein the amines are no amino acids, and di and/or tricarboxylic acids, and optionally amino acids and/or
      viii) at least two compounds defined in i) to iii), and
   b) component B comprising component B1 which is 1,3-dihydroxyacetone, glycolaldehyde, glyceraldehyde or any mixture thereof,
   wherein polymer(s) A1 has (have) a total weight average molecular weight $M_{w,total}$ of at least 800 g/mol;
   and the core layer comprises a binder selected form the group consisting of urea/formaldehyde binder, phenol/formaldehyde binder, melamine/urea/formaldehyde binder, PMDI binder and mixtures thereof.

25. The process according to claim 23, wherein in step c) or c') the press time factor is at most 12 s/mm.

26. The process according to claim 23, wherein 3 to 15 wt.-% polymer(s) A1 and hydroxyacetone in total, based on the total oven-dry weight of the lignocellulosic pieces are used for the preparation of the lignocellulose-based composite article.

27. The process according to claim 23, wherein both components A and B of the binder composition are added to the lignocellulosic pieces in step a) either
   a1) separately from one another or
   a2) as a mixture.

28. The process according to claim 23, wherein the lignocellulosic pieces are prepared from wood.

29. The process according to claim 23, wherein the component B of the binder composition comprises a mixture obtained by a formose reaction from formaldehyde.

30. A process for the batchwise or continuous production of lignocellulose-based composite articles which are glulam, plywood, cross laminated timber, blockboards or solid wood boards, comprising the following steps
   a) applying the binder components as defined in claim 1 onto at least one surface of one or more lignocellulosic pieces
   b) joining the one or more lignocellulosic pieces having the binder composition thereon with one or more lignocellulosic pieces and
   c) pressing the lignocellulosic pieces at a temperature of 20 to 200° C. and at a pressure of 1 to 100 bar together, wherein the lignocellulosic pieces are beams, lamellas, blanks and/or veneers.

* * * * *